United States Patent
Kashyap et al.

(10) Patent No.: US 10,739,551 B1
(45) Date of Patent: Aug. 11, 2020

(54) COMPENSATING FOR ORIENTATION AND TEMPERATURE RELATED CHANGES IN CAMERA FOCUS

(71) Applicant: Amazon Technologies, Inc., Seattle, WA (US)

(72) Inventors: Abhinav Kashyap, Seattle, WA (US); Leo Benedict Baldwin, Seattle, WA (US); Prachi Pradhan, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/840,739

(22) Filed: Dec. 13, 2017

(51) Int. Cl.
*G02B 7/09* (2006.01)
*G02B 7/28* (2006.01)
*H04N 5/225* (2006.01)

(52) U.S. Cl.
CPC ............... *G02B 7/09* (2013.01); *G02B 7/285* (2013.01); *H04N 5/2254* (2013.01)

(58) Field of Classification Search
CPC . G02B 7/09; G02B 7/08; G02B 7/028; G02B 7/285; G02B 7/28; G02B 5/32; H04N 5/225; H04N 5/2254; H04N 5/23212
USPC ...... 359/814, 820, 824, 900; 396/61, 89, 97, 396/133
See application file for complete search history.

(56) References Cited

U.S. PATENT DOCUMENTS

| | | | |
|---|---|---|---|
| 7,561,202 B2 * | 7/2009 | Goto | G02B 7/102 348/335 |
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 2013/0284806 A1 | 10/2013 | Margalit | |

* cited by examiner

*Primary Examiner* — Jie Lei
(74) *Attorney, Agent, or Firm* — Lee & Hayes, P.C.

(57) ABSTRACT

This disclosure describes techniques to compensate for changes in a depth of field of a camera caused by changes in orientation of the camera (e.g., tilt) and changes in the temperature of the camera. For instance, the described techniques may utilize an actuator, such as a voice-coil motor, of the camera to adjust an image distance of the camera lens to compensate for changes in the depth of field of the camera caused by changes in the orientation of the camera and/or changes in temperature of the camera. One or more models may be generated using calibrated input current values for the voice-coil motor which indicate, for various changes in orientation and temperature of the camera, input current values to cause the voice-coil motor to adjust the image distance of the camera to maintain the desired depth of field.

19 Claims, 10 Drawing Sheets

COMPENSATING FOR ORIENTATION AND TEMPERATURE RELATED CHANGES IN CAMERA FOCUS

BACKGROUND

Cameras are often used to monitor locations in various industries, such as security-service industries, machine-automation industries, retail industries, and so forth, in order to identify events occurring at the locations. For instance, in retail industries, physical stores maintain inventory in customer-accessible areas, such as in a shopping area, and customers are able to pick items from inventory and take them to a cashier for purchase, rental, and so forth. Inventory control systems may use cameras and additional sensors to maintain an accurate count of the items stored at or removed from the fixed inventory locations. Additionally, although most physical stores utilize cashiers or dedicated self-checkout stands to finalize transactions with customers, future physical stores may utilize cameras, in addition to an array of sensors, to allow users to acquire and pay for items without cashiers or dedicated self-checkout stands. However, if cameras used to monitor fixed locations in physical stores are focused to have a depth of field that does not clearly capture the fixed locations, operators of these physical stores are unable to accurately identify changes in inventory occurring at the fixed locations.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
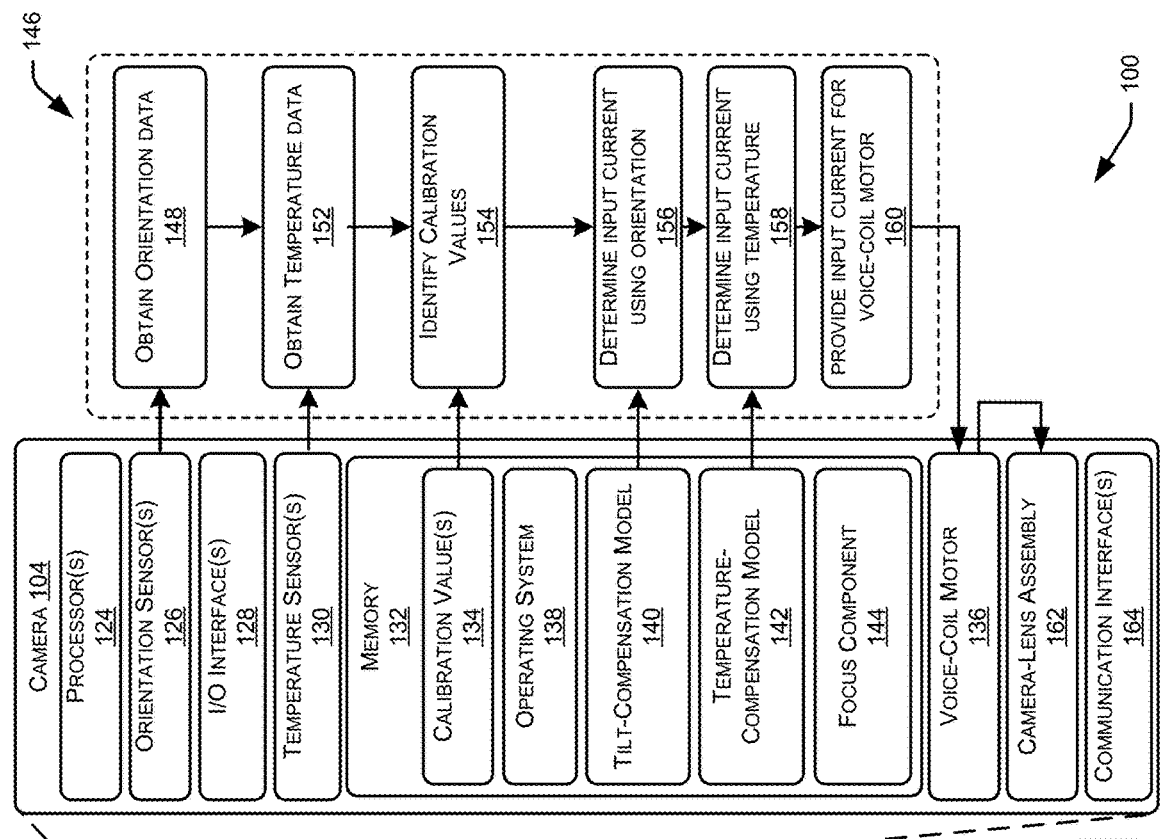
FIG. 1 illustrates an example environment where a depth of field of a camera is corrected to overlap with a desired location in a materials handling facility. In some examples, the depth of field of the camera may undesirably change based on orientation changes of the camera and/or changes in temperature. In response, the depth of field may be corrected, with the amount of the correction being determined using models trained to compensate for the undesirable changes in the depth of field.
Figure 1:
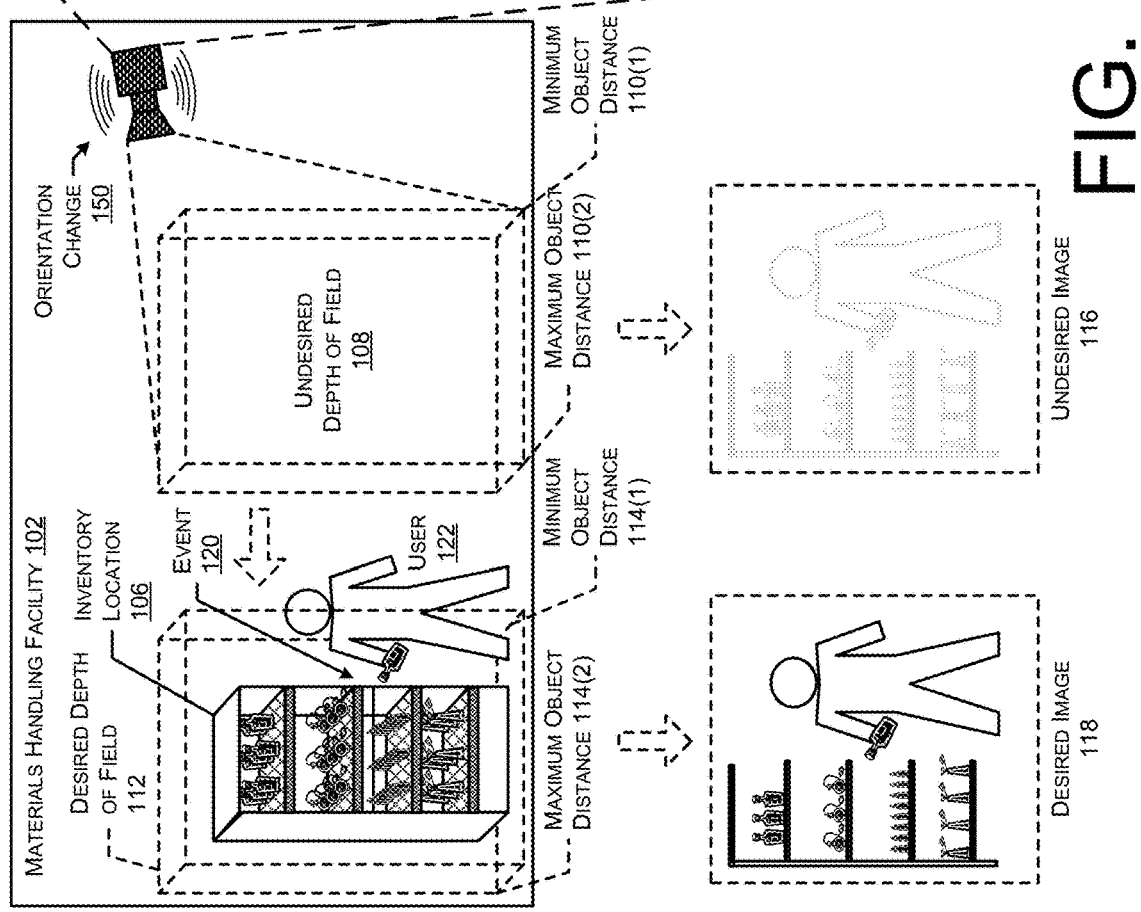

This disclosure describes systems and techniques to compensate for changes in a depth of field of a camera caused by changes in orientation of the camera (e.g., tilt) and changes in a temperature associated with the camera. For instance, a depth of field of the camera may change, undesirably, based on changes in a surrounding temperature of the camera and/or based on a change in tilt of the camera. The described techniques may then utilize a motor of the camera, such as a voice-coil motor, to adjust an image distance of the camera lens to compensate for these undesirable changes.

In some examples, the camera may be calibrated based on various calibrated values, such as calibrated temperature values, calibrated camera orientation values, and calibrated input current values for the controlling voice-coil motor, that result in the voice-coil motor setting the image distance of the camera such that the camera is focused at a desired object distance and/or depth of field. Using the calibrated camera orientation values and the calibrated input current values, a tilt compensation model may be generated which indicates, for various increments of change in orientation of the camera, corresponding changes in input current to the voice-coil motor to adjust the image distance of the camera such that the camera remains focused at the desired object distance.

Similarly, using the calibrated temperature values and the calibrated input current values, a temperature compensation model may be generated which indicates, for various increments of change in temperature of the camera, corresponding changes in input current to the voice-coil motor to adjust the image distance of the camera such that the camera remains focused at the desired object distance. Upon detecting a change in orientation of the camera and/or a change in temperature of the camera, components of the camera may use the tilt compensation model and/or the temperature compensation model to determine a new input current to provide to the voice-coil motor to maintain the desired object distance and/or depth of field.

In some examples, an image distance of a camera lens (e.g., the distance between the lens assembly of the camera and the image sensor of the camera) dictates the object distance to a location at which the camera is focused. Generally, the object distance may correspond to the location in an environment of the camera at which objects are in focus, and the depth of field (DOF) of the camera may correspond to the distance range between a minimum object distance and a maximum object distance that maintain a threshold image sharpness, or a generally acceptable image sharpness, for the image distance of the camera lens. In various examples, a voice-coil motor may have an input current supplied to it by components of the camera in order to produce a magnetic field which reacts with a permanent magnet of the camera to adjust the image distance of the camera lens. Depending on the configuration of the camera, the voice-coil motor may cause the image sensor to move relative to a fixed lens assembly to adjust the image distance, and in other examples, the voice-coil motor may cause the lens assembly to move relative to a fixed image sensor to adjust the image distance.

The electro-magnetic force (F) generated by a voice-coil motor may be a product of the force constant (k), the magnetic flux density (B), the length of the wire of the coil (L), the input current (I), and the number of conductors (N), such that F=k*B*L*I*N. For a given voice-coil motor, each parameter for calculating the force may be fixed besides the input current. Accordingly, the strength of the electromagnetic force created by a voice-coil motor is directly proportional to input current. Using this direct proportionality, input current to the voice-coil motor may be used as a mechanism for controlling the image distance of the camera lens (e.g., moving the image sensor relative to the lens assembly, moving the lens assembly relative to the image sensor, etc.).

Generally, a camera fixed to a location in an environment, such as a physical store of a retailer, will substantially maintain a DOF and object distance provided the voice-coil motor of the camera is supplied with a constant input current. However, in some examples, changes in environment conditions of the camera may in turn cause the focal length, and thus the DOF, of the camera to change. For example, a camera that is without active thermal stabilization may experience significant change in focal length due to temperature change. As described herein, a temperature of the camera, or a temperature associated with the camera, may include or be associated with temperatures acquired by different sources and/or at different locations. For example, the temperature of the camera, or associated with the camera, may include or correspond to an ambient temperature of the camera (e.g., a temperature of the surrounding environment of the camera), a temperature internal to the camera (e.g., the ambient temperature in combination with the heat emitted from components of the camera), and/or a temperature internal to the camera lens assembly and/or camera housing. Similarly, changes in the temperature of the camera, or changes in the temperature associated with the camera, may be caused by changes in the ambient temperature of the camera, changes in heat emitted by components of the camera, and so forth. However, depending on the configuration and location of the camera in an environment, the temperature associated with the camera, and any changes thereof, may be associated with or caused by any other type of heating/cooling source which may affect the focal length of the camera.

Changes in temperature may cause changes in the refractive index of the lens elements in the lens assembly, thermal expansion of a lens housing (e.g., lens barrel), and the lens holder which holds the lens assembly. Depending on the camera, camera lens elements are often made of varying types materials (e.g., optical thermoplastics, glass, glass-fiber, etc.) which have varying coefficients of thermal expansion. In some examples, the lens assembly of a camera may comprise lens elements made of materials which have a high enough thermal coefficient of refractive index (e.g., 50×10$^{-5}$/° C., 60×10$^{-5}$/° C., etc.) such that when the camera is subjected to enough of a fluctuation in temperature (e.g., 1° C., 5° C., 10° C., 15° C., etc.), the lens elements experience a change in refractive index. This change in refractive index of the lens elements may result in a relatively significant change in the focal length of the camera lens, which in turn may result in a relatively significant change in the object distance and DOF of the camera. For example, a camera positioned near a ceiling of a physical store of a retailer may be subjected to a 10° C. change in temperature every day simply from warm air rising from morning until evening. In some examples, a camera may be positioned near certain locations in a physical store (e.g., near a refrigerated area for produce, near ovens for a bakery area for baked goods, etc.) such that the camera is subjected to even more frequent (and potentially more severe) changes in ambient temperature. Depending on the configuration and materials used in the lens assembly of the camera, a 10° C. change in temperature may result in changes of refractive index of the lens elements which changes the image distance such that an object distance and DOF may be significantly shifted.

As an example, a camera may be mounted in a physical store and configured to supply its voice-coil motor with input current to set the image distance of the camera such that the camera has an object distance of about 4 meters to monitor a fixed inventory location in the store. However, depending on the materials of the lens assembly, a 10° C. change in temperature may result in a shift in object distance and DOF of roughly 2 meters, which results in the fixed location to appear blurry, fuzzy, or otherwise unrecognizable in images captured by the camera. In this way, computer algorithms which rely on distinct feature detection are unable to detect events occurring at the fixed location, and even humans may be unable to determine events occurring at the fixed location. In some examples, auto-focus components may be used which utilize image sharpness criteria and/or image contrast criteria to control the image distance between the lens assembly and the image sensor for the desired object distance and DOF. These criteria often use spatial recognition to identify the largest or most prominent space in the picture, and assume that is the desired target for focus. However, the movement of customers and/or items in physical stores may cause problems for these types of techniques, such as occlusion of the camera field of view, change in illumination levels in the environment, and so forth. Accordingly, these types of image contrast and sharpness metrics may be ill-suited for monitoring fixed locations in certain environments.

The techniques described herein compensate for changes in focal length of a camera lens caused by fluctuations in temperature of the camera. In some examples, a focus component of the camera may be configured to control input current to the voice-coil motor of the camera to maintain a desired object distance despite changes in focal length of the camera caused by temperature. The focus component may include software, firmware, and/or hardware which control the input current to the voice-coil motor to adjust the image distance of the camera lens.

In some examples, a temperature-compensation model may be created or generated for the camera which generally models the focus behavior of the camera when subjected to different temperatures (e.g., ambient temperatures). Due to differences in intrinsic parameters of cameras caused by differences in materials used, slight changes in manufacturing, etc., the temperature-compensation model may be created for different camera types, camera models, or for each individual camera. For instance, a manufacturer of the camera or an operator of the camera may calibrate the camera either prior to installation, or after installation, to determine calibrated input current values for the voice-coil motor to maintain a desired object distance and DOF for different calibrated temperature values. As an example, factors that affect the focal length of a camera may be kept constant (e.g., orientation) while the temperature for the camera is varied. The temperature of the camera may be varied to different calibrated temperature values, and for each different calibrated temperature value, a calibrated input current value to maintain a desired object distance and DOF may be determined. For instance, image sharpness metrics and/or contrast metrics may be used to determine calibrated input current values for different calibrated temperature values which cause the voice-coil motor to change the image distance of the camera such that the desired object distance and DOF are "in focus" (e.g., the camera captures images of the desired location that have higher than a threshold image sharpness metric and/or contrast metric). In instances where the manufacture of the camera determines these calibrated values, the values may be stored in memory of the camera (e.g., Flash memory, Random Access Memory (RAM), etc.) prior to shipping the camera to the purchaser, such as the operator of the physical store.

These calibrated temperature values and corresponding calibrated input current values may be used to generate the temperature-compensation model. For example, two or more pairs of the calibrated temperature values and calibrated input current values for the desired object distance may be plotted on a temperature versus input current graph to create curve to estimate a rate at which to vary input current for the voice-coil motor with respect to changes temperature to maintain the desired object distance. In some examples, the plotted calibration points of the temperature-compensation model may be positioned on the graph in a substantially linear arrangement, and may further have a linear fit applied thereon to approximate a slope of the line defined by the arrangement of the plotted calibration points. However, other functions may be created or approximated by plotting the calibrated points of calibrated temperature values and corresponding calibrated input current values. For a linear relationship, the slope of the line may represent or define a "temperature calibration factor" used by the focus component to determine a new input current value for the voice-coil motor to compensate for changes in focal length of the camera lens caused by changes in temperature.

In some examples, the camera may include, or be communicatively coupled, to one or more sensors including a temperature sensor. The focus component may continuously, or periodically (e.g., every 15 minutes, 30 minutes, 60 minutes, etc.), analyze a sensor reading from the temperature sensor to determine whether to determine a new input current to change the image distance of the camera lens. For instance, if a change in temperature from a last recorded temperature reading changes by more than a threshold amount (e.g., ½° C., 1° C., 5° C., etc.), the focus component may determine that a new input current for the voice-coil motor is to be determined to adjust for changes in the focal length caused by the change in temperature. The focus component may identify (e.g., read from memory) a calibrated temperature value and a corresponding calibrated input current value, determine a temperature difference value between the calibrated temperature value and a current temperature value received from the temperature sensor, and multiply that temperature difference value by the temperature calibration factor determined using the temperature-compensation model to identify a new input current value for the voice-coil motor. In some examples, the camera may be powered by a battery, and the current provided to the voice-coil motor may be provided by a current output digital-to-analog converter. Accordingly, the input currents described herein may be referenced as DAC current. However, any type of voltage, current, or power source may be used to power the voice-coil motor. As an example, the calibrated temperature value ($t_{cal}$) may be 20° C., the corresponding calibrated input current value ($DAC_{cal}$) may be 108 mA, the current temperature value ($t_{in}$) may be 30° C., and the temperature calibration factor ($k_{temp}$) for the camera may be roughly 1.41 mA/° C. Thus, a new input current value to control the voice-coil motor to change the image distance of the camera lens to compensate for the temperature change may be determined using the following equation:

$$DAC_{temp}=DAC_{cal}+(k_{temp}(t_{in}-t_{cal}))  \quad\text{(Equation 1)}$$

Thus, to compensate for a change in temperature (e.g., more than a threshold change in temperature) using the calibrated values and Equation 1, the new input current to control the voice-coil motor to change the image distance of the camera lens to compensate for the temperature change is $DAC_{temp}$=122.1 mA. Accordingly, the focus component of the camera may utilize the temperature-compensation model, which was generated based on calibrated temperature values and calibrated current values, to determine, for a temperature of the camera detected by the temperature sensor, an input current to provide the voice-coil motor in order to adjust the image distance of the camera lens to maintain a desired object distance and DOF for the camera In some examples, the focus component of the camera may further be configured to compensate for changes in the object distance and DOF of the camera caused by changes in orientation of the camera (e.g., tilt). In the example of a physical retail store, maintenance personnel, customers, employees, etc., may bump, move, or otherwise cause an orientation of the camera to change, which in turn may change the focal length of the camera lens. The change in focal length experienced due to a change in orientation may be caused based on changes in the forces acting on the lens assembly of the camera. In some examples, the lens assembly of the camera and the voice-coil motor may be coupled together to create a camera-lens assembly. The camera-lens assembly generally has various forces acting on it, such as the force of friction from the walls of the lens housing ($F_f$), the weight of camera-lens assembly due to the gravitational force ($F_w$), and the restoring resilience force ($F_s$), which is the force to overcome a resistance of one or more suspension springs of the camera-lens assembly. To achieve a desired image distance, the voice-coil motor may be provided with the appropriate amount of input current to create an electromagnetic force ($F_{vcm}$) to counteract these forces and place the lens assembly the appropriate distance from the image sensor. Accordingly, the force of the voice-coil motor may be defined by the following equation:

$$F_{vcm}=F_w+F_f+F_s  \quad\text{(Equation 2)}$$

In some examples, a tilt-compensation model may be created or generated for the camera which models the focus behavior of the camera when subjected to various orientations. Depending on the exact configuration, type, and placement of the camera, certain assumptions may be made to generate the tilt-compensation model to approximate changes in input current to compensate for changes in focal length caused by a change in orientation of the camera. In various examples, the manufacturer of the camera or operator of the camera may calibrate the camera either prior to installation, or after installation, to determine calibrated input current values for the voice-coil motor to maintain a desired object distance and DOF for different calibrated orientation values. As an example, the camera may be placed at one or more calibrated orientations, and for each of the one or more calibrated orientations, calibrated input current values to maintain the desired object distance and DOF may be determined. In some examples, depending on the camera, further assumptions or calculations may be made. For instance, when analyzing the relationship between the calibrated orientation values and the calibrated current values, it may be determined that the restoring resilience force is considered a constant in that the one or more suspension springs will be associated with relatively the same amount of force to restore reliance to regardless of the orientation. Similarly, the force due to friction between the camera-lens assembly and the lens housing is generally negligible as the camera may be designed to have low amounts of friction to reserve power. Accordingly, force generated by the voice-coil motor is approximately equivalent to the component of the weight of the camera-lens assembly caused by the force of gravity, which may be parallel to an oriented optical axis of the camera lens.

In some examples, further analysis may be performed to model the behavior of input current for the voice-coil motor to maintain a desired image distance despite changes in orientation. For instance, it may be determined that certain changes in orientation do not affect the force from the weight of the camera for which the voice-coil motor is to compensate. Generally, pitch, roll, and yaw may be used to define the orientation of the camera. In some examples, during calibration the camera may be oriented upwards against gravity (a "zero-degree orientation"). Further, the camera may be fixed or positioned such that the weight of the camera due to gravity is only affected by changes in the roll angle of the camera relative to the zero-degree orientation of the camera. Accordingly, when the orientation of the camera is changed, the input current to compensate for the change in orientation may be substantially proportional to the roll angle of the camera. Based on the one or more calibration orientations and the one or more calibrated input current values, the new input current value for the voice-coil motor may be defined as being proportional to the roll angle ($\theta_{roll}$), where the roll angle is defined with respect to the zero-degree calibrated orientation of the camera. In some examples, the tilt-compensation model may define the relationship between change in orientation of the camera, and the input current to maintain the focal length of the camera lens, using the following equation:

$$DAC_{roll} = (DAC_{cal} * ((\cos \theta_{roll}) + 2))/3 \qquad \text{(Equation 3)}$$

In some examples, the sensors of the camera may further include one or more orientation sensors, such as an accelerometer, gyroscope, magnetometer, and so forth. The focus component may continuously, or periodically (e.g., every 15 minutes, 30 minutes, 60 minutes, etc.), analyze a sensor reading from an orientation sensor to determine a new input current based on relationship between orientation and input current defined by Equation 3. Thus, the focus component may determine a new input current value to control the voice-coil motor to change the image distance of the camera lens to compensate for a change in orientation of the camera.

In some examples, the focus component may obtain sensor data from the temperature sensor at a separate time from the one or more orientation sensors, and perform separate calculations to modify the voice coil input current based on detected changes in the temperature and/or orientation. However, in some examples, the focus component may obtain sensor readings from the temperature sensor and the orientation sensor(s) at the same time, or in close proximity to each other, and perform calculations to determine the new input current based on both sensor readings, as will be described further below.

The techniques described herein are generally applicable to a variety of industries and for a variety of camera configurations. For example, the techniques may be used for various types of camera lens configurations, involving different lens assembly suspensions, different fixed components of the camera lens, and different types of motors. For example, different camera lens may use various lens assembly suspensions involving springs. In one example, a suspension spring may be biased towards pulling the lens assembly towards the image sensor inside the camera, while in other examples, multiple suspension springs may be biased to hold the lens assembly in a neutral position in the lens housing. In either arrangement, the techniques described herein may similarly be applied to adjust the input current to the voice-coil motor to overcome the "lift-off" current to overcome the initial bias of the various suspension spring arrangements, and to further position the lens assembly for the desired image distance. Further, the techniques may be applied for different arrangements of the lens assembly and the image sensor. In some examples, the image sensor may be fixed or stationary and the voice-coil motor may move the lens assembly in the lens housing to the desired image distance, and in other examples, the lens assembly may be fixed or stationary and the image sensor may be moved in the lens housing relative to the lens assembly for the desired image distance. Further, the techniques may generally be used for cameras which employ the use of various types of motors. For example, the techniques may be similarly applied using input voltages, and for any type of motor or actuator (e.g., linear voice-coil motors, solenoids, linear actuators, etc.).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility 102 including a camera 104 interacting with a desired location, such as an inventory location 106, in the materials handling facility 102. A depth of field of the camera 104 is corrected to overlap with a desired location in the materials handling facility 102. In some examples, the depth of field of the camera 104 may undesirably change based on orientation changes of the camera and/or changes in temperature. In response, the depth of field may be corrected, with the amount of the correction being determined using models trained to compensate for the undesirable changes in the depth of field.

As illustrated in FIG. 1, the camera 104 has an undesired depth of field 108 defined by a minimum object distance 110(1) of the camera and a maximum object distance 110(2). In some examples, the camera 104 may have originally been calibrated to have a desired depth of field 112, defined by a corresponding minimum object distance 114(1) and a maximum object distance 114(2), corresponding to the inventory location 106, but due to changes in orientation of the camera 104 and/or changes in temperature of the camera 104, a focal length of the camera was changed to result in the undesired depth of field 108.

Thus, when the camera 104 is focused at the undesired depth of field 108, the camera 104 may capture, record, stream, etc., an undesired image 116 which corresponds to the undesired depth of field 108 that illustrates the inventory location 106 as blurry, fuzzy, or otherwise unrecognizable. According to techniques described herein, components of the camera 104 may compensate for changes in orientation and/or temperature of the camera 104 by changing an image distance of the camera to achieve the desired depth of field 112, which results in a desired image 118 of the inventory location 106.

As illustrated, the desired image 118 shows an event 120 involving a user 122 picking an example item from a shelf of the inventory location 106 within the materials handling facility 102. While the environment 100 illustrates the materials handling facility 102, the environment may alternatively comprise any environment in which a camera monitors or views one or more locations. In this example, the environment 100 may further include an array of sensors to detect the picking of the item from the shelf. For instance, a shelf may include one or more weight sensors to detect changes in weight on the shelf, such that sensor data indicating a decrease in weight indicates that an item has been removed and an increase in weight indicates that an item has been added. Further, the shelf may include one or more cameras 104 that may acquire images of the shelf to detect when items have been removed. In still other instances, the environment may include one or more overhead cameras 104 to detect the user 122 removing the item from the shelf.

In some examples, the camera 104 may comprise various hardware, firmware, and/or software components configured to compensate for the change between the undesired depth of field 108 and the desired depth of field 112. The camera 104 may include one or more processors 124 for powering the various software, firmware, and hardware components of the camera 104. The camera 104 may include various hardware components, such as one or more orientation sensors 126, one or more input and output (I/O) interfaces 128, and one or more temperature sensors 130.

Generally, the orientation sensor(s) 126 may include any type of sensor for detecting or determining an orientation and/or a change in orientation. For example, the orientation sensor(s) 126 may include one or more accelerometers which may provide accelerometer data such as the direction and magnitude of an imposed acceleration due to changes in orientation of the camera 104. Data such as rate of acceleration, determination of changes in direction, speed, and so forth, may be determined using the accelerometers. Further, the orientation sensor(s) 126 may include one or more gyroscopes which provide gyroscope data indicative of rotation of the camera 104. In some examples, the orientation sensor(s) 126 may further include one or more magnetometers which may be used to determine an orientation of the camera 104 by measuring ambient magnetic fields, such as the terrestrial magnetic field. The magnetometer may generate magnetometer data indicative of the direction, strength, and so forth of a magnetic field.

In various examples, the I/O interfaces 128 may allow the various components of the camera to communicate with other components of the camera, as well as other devices. the I/O interfaces 128 may comprise Inter-Integrated Circuit (I2C), Serial Peripheral Interface bus (SPI), Universal Serial Bus (USB), and so forth. For example, the temperature sensor(s) 130 and/or the orientation sensor(s) 126 may report sensor data using the I/O interface(s) 128, such as the I2C interface. In various examples, the temperature sensor(s) 130 may comprise any type of sensor configured to determine temperature and/or changes in temperature, such as thermistors, thermocouples, resistance-based thermometers, etc. The temperature sensor(s) 130 may be configured to detect the temperature, and changes in the temperature, of the camera. Such changes in temperature may be due to changes in temperature of the materials handling facility 102 (e.g., heat rising throughout the day), or heat dissipated by components of the camera 104.

The camera may further include memory 132, which stores various software and/or firmware components of the camera 104, as well as data such one or more calibration values 134 that were used to calibrate the camera. In some examples, the calibration values may be stored in Flash memory, Random Access Memory (RAM), or the like, and may be stored by a manufacturer of the camera 104 prior to shipping the camera 104, or stored by an operator of the camera 104 prior to installation of the camera 104 in the materials handling facility 102. The calibration values 134 may include indications of one or more orientations used when calibrating the camera 104, indications of one or more temperature values when calibrating the camera 104, and indications of calibrated input current values for controlling a voice-coil motor 136 of the camera 104. Although many of the techniques described herein contemplate the use of input current values for controlling the voice-coil motor 136, in some examples input voltage values may be used instead of input current values, or in addition to input current values. In some examples, the calibrated input current values for the controlling voice-coil motor 136 are associated with calibrated orientation values and calibrated temperature values that result in the voice-coil motor 136 setting the image distance of the camera 104 such that the camera 104 is focused at the desired object distance (e.g., in a focus range between the maximum object distance 114(2) and the minimum object distance 114(1)), and the desired depth of field 112.

Further, the memory 132 may include an operating system 138 configured to manage hardware resource devices such as the orientation sensor(s) 126, I/O interfaces 128, the temperature sensor(s) 130, and provide various services to applications or components executing on the process(s) 124. Additionally, the memory 132 may store various models, such as a tilt-compensation model 140 and a temperature-compensation model 142, which may be used by a focus component 144, stored in the memory 132, to compensate for a change in a focal length of the camera 104 caused by changes in orientation of the camera 104 and changes in temperature of the camera 104. Details regarding how the tilt-compensation model 140 and the temperature-compensation model 142 are generated, determined, and/or configured are described in more detail below with respect to FIG. 2 and FIG. 3.

Generally, the focus component 144 may comprise various types of computer code, such as software and/or firmware, and be configured to manage operations of the camera 104 to compensate for changes in the depth of field of the camera 104 caused by changes in orientation of the camera 104 (e.g., tilt) and changes in the temperature of the camera 104. In some examples, the focus component 144 may perform one or more steps of a process 146 to compensate for changes in the depth of field of the camera 104. For instance, at 148, the focus component 144 may obtain (e.g., receive), from the orientation sensor(s) 126, orientation data which indicates an orientation of the camera 104. In some examples, the focus component 144 may store previous readings from the orientation sensor(s) 126 and determine whether the new orientation data indicates that an orientation change 150 has occurred, or that more than a threshold change has occurred. In some examples, the focus component 144 may obtain or receive the orientation data at 148 from the orientation sensor(s) 126 continuously, or periodically (e.g., every 15 minutes, every 30 minutes, etc.). Similarly, the focus component 144 may, at 152, obtain (e.g., receive), from the temperature sensor(s) 130, temperature data which indicates a temperature of the camera 104. The focus component 144 may further store previous readings from the temperature sensor(s) 130 and determine whether the new temperature data indicates that a temperature change has occurred, or that more than a threshold change in temperature has occurred from the previous readings.

At 154, the focus component 144 may identify (e.g., read from memory) calibration values 134, such as calibrated temperature values, calibrated camera orientation values, and calibrated input current values for the controlling the voice-coil motor 136. The calibrated values 134 may further include a temperature calibration factor ($k_{temp}$) which represents a rate at which an estimated amount of current, provided to the voice-coil motor 126 to maintain the desired object distance and/or DOF 112, changes with respect to changes in temperatures of the camera 104.

At 156, the focus component 144 may determine and/or modify an input current based on the orientation of the camera 104 determined at 148. For instance, the focus component 144 may use the tilt-compensation model 140 to determine, compensate, and/or modify the input current that is to be provided to the voice-coil motor 136 based on a change in the orientation of the camera 104. Similarly, at 158, the focus component 144 may further determine and/or modify the input current using the temperature-compensation model 142. For instance, the focus component 144 may determine a change in temperature using the temperature data 152, and previously stored temperature data (e.g., calibration values 134). Based the change in temperature, as well as the temperature calibration factor, the focus component 144 may determine a new input current to compensate for a change in temperature. In some examples, at 156 and/or 158, the focus component 144 may additionally, or alternatively, determine an input voltage using the orientation and/or temperature, as described in more detail below.

Upon determining the input current to provide to the voice-coil motor 136 to adjust an image distance of the camera 104 to focus at the desired object distance and/or desired DOF 112, the focus component 144 may, at 160, provide the input voltage and/or current to the voice-coil motor. In some examples, the focus component 144 may include, or be communicatively coupled to, a voice-coil motor driver which provides the input current to the voice-coil motor 136. In various examples, the camera 104 may be a battery-powered device. In such examples, the power provided by the battery of the camera 104 may be in the form of direct current. However, to power a voice-coil motor 136, the input current may be alternating current to generate an electro-magnetic field. Accordingly, the voice-coil motor driver may include, or be associated with, a digital-to-analog converter (DAC) which receives a digital signal from the focus component 144, converts the digital signal, and outputs an analog signal to the voice-coil motor 136 in order to create an electro-magnetic force to adjust or maintain the image distance of the camera 104. For instance, the voice-coil motor 136 may input a digital signal to the voice-coil motor driver which indicates the input current to provide to the voice-coil motor 136, convert that digital signal to an analog signal, and provide the appropriate AC input current to the voice-coil motor 136. The voice-coil motor 136 may then create an electro-magnetic force which positions an image sensor and a lens assembly included in the camera-lens assembly 162 to an image distance which results in the desired DOF 112 for the camera 104. In other examples, the camera 104 may be powered from mains power such that a digital-to-analog converter is unnecessary.

In some examples, the camera 104 may further include one or more communication interfaces 164 that are configured to provide communications between the camera 104 and other devices, such as other devices in the materials handling facility 102, servers associated with the materials handling facility 102, and so forth. The communication interface(s) 164 may include devices configured to couple to personal area networks (PANs), wired and wireless local area networks (LANs), wired and wireless wide area networks (WANs), and so forth. For example, the communication interface(s) 164 may include devices compatible with Ethernet, Wi-Fi™, and so forth. The camera 104 may also include one or more busses or other internal communications hardware or software that allow for the transfer of data between the various components, sensors, devices, and so forth, of the camera.

In some examples, the temperature sensor(s) 130 may be positioned at one or more locations internal to the camera 104. For instance, the temperature sensor(s) 130 may be positioned in or near the camera-lens assembly 162, a housing of the camera 104, on a printed circuit board (PCB) internal to the camera 104, and/or any other location(s) internal, or on an exterior, of the camera 104. However, although the temperature sensor(s) 130 are illustrated as being internal to the camera 104, in some examples the temperature sensor(s) 130 may be positioned exterior the camera and in an environment of the camera, such as the materials handling facility 102. In such examples, the camera 104 may be communicatively coupled to the temperature sensor(s) 130, or another computing device associated with the temperature sensor(s) 130, to obtain temperature measurements from the temperature sensor(s) 130.

Figure 2:
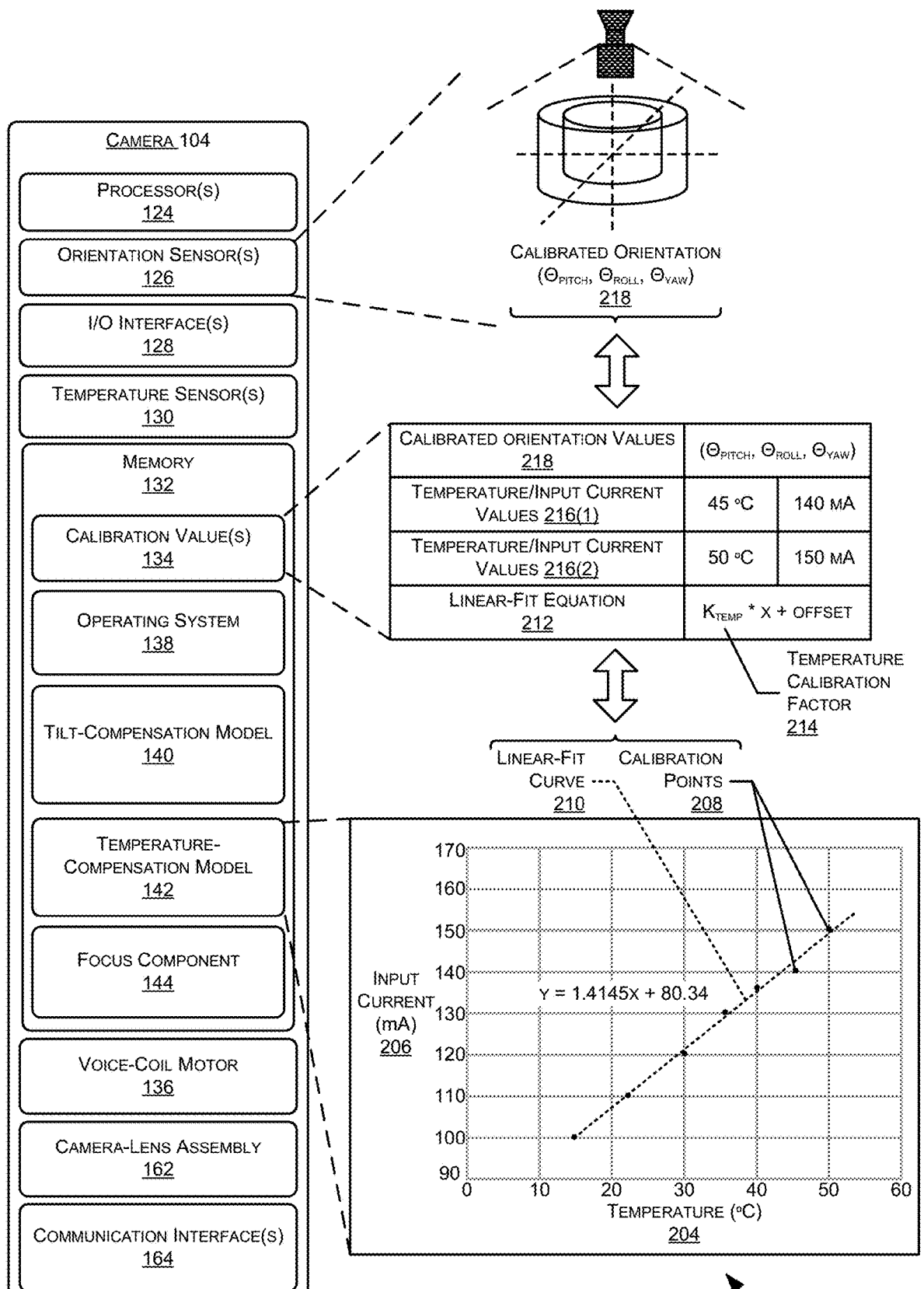
FIG. 2 illustrates example techniques for determining a tilt-compensation model and a temperature-compensation model that are usable by components of a camera to compensate for changes in depth of field of the camera caused by changes in orientation of the camera and changes in temperature of the camera.

FIG. 2 illustrates example techniques for determining a tilt-compensation model 140 and a temperature-compensation model 142 that are usable by components of a camera 104 to compensate for changes in depth of field of the camera 104 caused by change in orientation of the camera 104 and change in temperature of the camera 104.

In various examples, a temperature-compensation model 142 may be created or generated for the camera 104 which generally models the focus behavior of the camera 104 when subjected to different temperatures. Due to differences in intrinsic parameters of cameras caused by differences in materials used, slight changes in manufacturing, etc., the temperature-compensation model 142 may be created for different camera types, camera models, or for each camera. In some examples, a manufacturer of the camera 104 or an operator of the camera 104 may calibrate the camera 104 either prior to installation, or after installation, to determine calibrated input current values for the voice-coil motor 136 to maintain a desired object distance and DOF for different calibrated temperature values. As an example, factors that affect the focal length of the camera 104 may be kept constant (e.g., orientation) while the temperature for the camera 104 is varied. The temperature of the camera 104 may be varied to different calibrated temperature values, and for each different calibrated temperature value, a calibrated input current value to maintain a desired object distance and DOF may be determined. For instance, image sharpness metrics and/or contrast metrics may be used to determine calibrated input current values for different calibrated temperature values which cause the voice-coil motor 136 to change the image distance of the camera 104 such that the desired object distance and DOF are "in focus" (e.g., the camera captures images of the desired location that have higher than a threshold image sharpness metric and/or contrast metric). In instances where the manufacture of the camera 104 determines these calibrated values, the values may be stored in memory 132 of the camera 104 (e.g., Flash memory, Random Access Memory (RAM), etc.) prior to shipping the camera 105 to the purchaser, such as the operator of the physical store.

As illustrated in FIG. 2, a graph 102 may represent the temperature-compensation model 142 where the graph 202 illustrates input temperature in degrees Celsius (° C.) 204 versus input current in milliamps (mA) 206. The graph includes multiple calibration points 208 which correspond to pairs of the calibrated temperature values and calibrated input current values for the desired object distance of the camera 104. The current values 206 are merely illustrative, and different current values may be determined based on the camera 104, the voice-coil motor 136, etc. In some examples, plotting these pairs of calibrated temperature values and corresponding calibrated input current values may result in a curve on the graph 202 which represents or estimates a rate at which to vary input current for the voice-coil motor 136 with respect to changes temperature to maintain the desired object distance. In some examples, the plotted calibration points 208 of the temperature-compensation model may be positioned on the graph resulting in a substantially linear arrangement. The arrangement of the plotted calibration points 208 on the graph may further have a linear-fit curve 210 applied thereon which is used to approximate a slope of the line. The slope of the linear-fir curve 210 may represent the temperature calibration factor $k_{temp}$ used by the focus component 144 to determine a new input current for the voice-coil motor 136 to compensate changes in focal length of the camera lens caused by changes in temperature. As shown in FIG. 2, the linear-fit curve 210 results in a linear-fit equation 212, such as a line defined as y=1.4145x+80.34 where the value 1.4145 (mA/° C.) is the temperature calibration factor 214. This factor 214 indicates that, for a calibrated object distance, as temperature of the camera 104 increases by 1° C., the input current for the voice-coil motor 136 may increase by 1.4145 mA to maintain the object distance by varying the image distance of the camera-lens assembly 162. Although illustrated at being a linear-fit curve 210, in some examples, the calibration points 208 may define other types of equations other than a linear relationship. For instance, depending on the configuration of the camera 102, the voice-coil motor 136, etc., the plotted calibration points 208 may result in another type of curve (e.g., parabolic, logarithmic, etc.) that may similarly be modeled using an equation. The equation determined by plotting the calibration points 208 may then be used to determine input current values based on temperatures of the camera 104 using techniques similar to those described herein.

Thus, using the temperature-compensation model 142, the relationship between input current to the voice-coil motor 136 to maintain an object distance when subjected to changes in temperature is known for the camera 104, and the temperature calibration factor 214 is stored in the memory 132, such as with the calibration value(s) 134. Additionally, the calibration value(s) 134 stored in the memory 132 may include pairs of the temperature/input current values 216(1) and 216(2) which were used as calibration points 208 on the graph 202 of the temperature-compensation model 142. Any number of temperature/input current values 216 may be stored in the memory 132.

Although the calibration values 134 are described as being calibrated current values, depending on voice-coil motor 136 and/or the focus component 144, the calibrated values may additionally, or alternatively, include calibrated voltage values. For example, rather than varying input current values to maintain desired object distance(s) 114 of the camera 104, input voltage values may be used to control the voice-coil motor 136. For example, the voice-coil motor 136 may comprise a relatively fixed load (e.g., resistance, impedance, etc.), and the voltage placed across the voice-coil motor 136 may be varied to in turn adjust the amount of input current flowing through coils of the voice-coil motor 136. In this way, and/or using other voltage control techniques, calibrated input voltage values may be determined to maintain desired object distance(s) 114 of the camera 104. Thus, the calibration value(s) 134, tilt-compensation module 140, and/or temperature-compensation model 140 may represent, be associated with, be determined by, etc., calibrated input voltage values in addition to, or instead of, calibrated input current values. In this way, voltage regulators, current regulators, or a combination thereof, and potentially other components, may be used for controlling the voice-coil motor. For example, similar to the techniques described herein with respect to determining calibrated current values, the techniques may be applied using calibrated voltage values. In one example, a motor or other actuator may be powered using different voltage values that are placed over a relatively fixed resistance and/or impedance load, and by varying the voltage placed across the load, corresponding changes in current will cause the motor 136 to adjust the camera-lens assembly. Thus, calibrated voltage values may similarly be determined in lieu of, or in combination with, calibrated current values. In even further examples, pairs of calibrated current and voltage values may also be determined to be used to cause the voice-coil motor 136 to adjust the camera-lens assembly 162 in order to maintain desired depths of field 112 despite changes in temperature and/or orientation associated with the camera 104.

As further illustrated in FIG. 2, the orientation sensor(s) 126 of the camera 104 may be used to determine one or more calibrated orientation values 218. In various examples, the calibrated orientation values 218 may indicate an orientation that the camera 104 was positioned at during calibration of the camera 104. In some examples, the pitch, roll, and yaw of the camera 104 may define the calibration orientation values 218 (e.g., $\theta_{pitch}$, $\theta_{roll}$, $\theta_{yaw}$). The calibrated orientation values 218 may be defined by any orientation that is kept constant through calibration. For instance, industry standards or other accepted practices may define the calibration orientation values 218. In other examples, the standard unit circle may define the calibration values 218. Regardless of how the calibration orientation values 218 are defined, the calibration orientation values 218 may be stored in memory 132 with the calibration value(s) 134 to indicate to the focus component 144 what changes in orientation of the camera 104 have occurred relative to the calibration orientation values 218. Using the calibration orientation values 218, the tilt-compensation model 140 may be generated, as further described in FIGS. 3A and 3B.

In various examples, the calibration value(s) 134 may be determined using different techniques, and stored in different formats. For example, rather than performing calibration (e.g., testing) of the camera 104 for different temperatures and/or orientations, calibration values may be known for other types or models of cameras, and based on differences between the other cameras and the camera 104, the calibration value(s) 134 for the camera 104 may be inferred or calculated. For instance, based on differences in the parameters of the camera 104, materials used in the camera 104, the camera-lens assembly 162 of the camera 104, etc., different input current values 206 for corresponding temperatures 204 may be determined for the camera 104. Similarly, differences between the other camera that calibration values are known may be used for the calibration value(s) 134 used based on orientation. For instances, differences in suspension springs between the camera, differences in weight of the cameras and/or the camera-lens assembly, and so forth, may be used to infer or calculate calibrated input currents for different orientations of the camera 104.

In various examples, the calibration value(s) 134 may be determined based on other parameters or characteristics of the camera 104 without the need for calibration or other camera calibration values. For instance, based on specifications for components of the camera 104 (e.g., voice-coil motor 136, camera-lens assembly 162, focus component 144, etc.), the calibrated input current values may be determined or estimated. The properties of the materials used, such as thermal expansion values for components of the camera 104, weight values for components of the camera 104, focal length of the camera 104, and so forth, the required current values 206 for the different temperatures 204 and orientation(s) 218 may be determined.

In some examples, the determination of the input current 206 to adjust the image distance of the camera 104 may be determined in real-time, or near-real-time, after obtaining the temperature and/or orientation measurements. In other examples, a table may be stored in the memory 132 which includes pre-calculated calibration value(s) 134 for different temperatures 204 and/or orientations of the camera 104. For instance, rather than calculating adjusted input current values 206 using the equations described herein after obtaining temperature and/or orientation readings, the input current values may be pre-calculated for different temperature, orientation, or temperature-orientation combinations. In this way, upon reading new temperature and/or orientation values of the camera 104, the temperature and/or orientation readings may be mapped to the appropriate location in the table, and an input current value for the readings may be determined using a look-up in the table. In this way, the focus component 144 may read or analyze a table storing relationships or associations between temperature and/or orientation readings and current values to achieve a desired object distance and/or desired DOF. Thus, the calibration value(s) 134 may include a table, or storage means, which stores associations between temperatures and current values to provide the voice-coil motor 136 to maintain a desired object distance of the camera 104. Similarly, the calibration value(s) 134 may store indications of associations between orientations of the camera 104 and current values to provide the voice-coil motor 136 to maintain a desired object distance. Thus, the focus component 144 may determine, based on readings from the temperature sensor(s) 130 and/or the orientation sensor(s) 126, current values that are indicated as being associated with maintaining desired object distance of the camera 104. Thus, the focus component 144 may identify the amount of current to provide the motor 136 based on values stored in memory 132 of the camera.

Figures 3A, 3B:
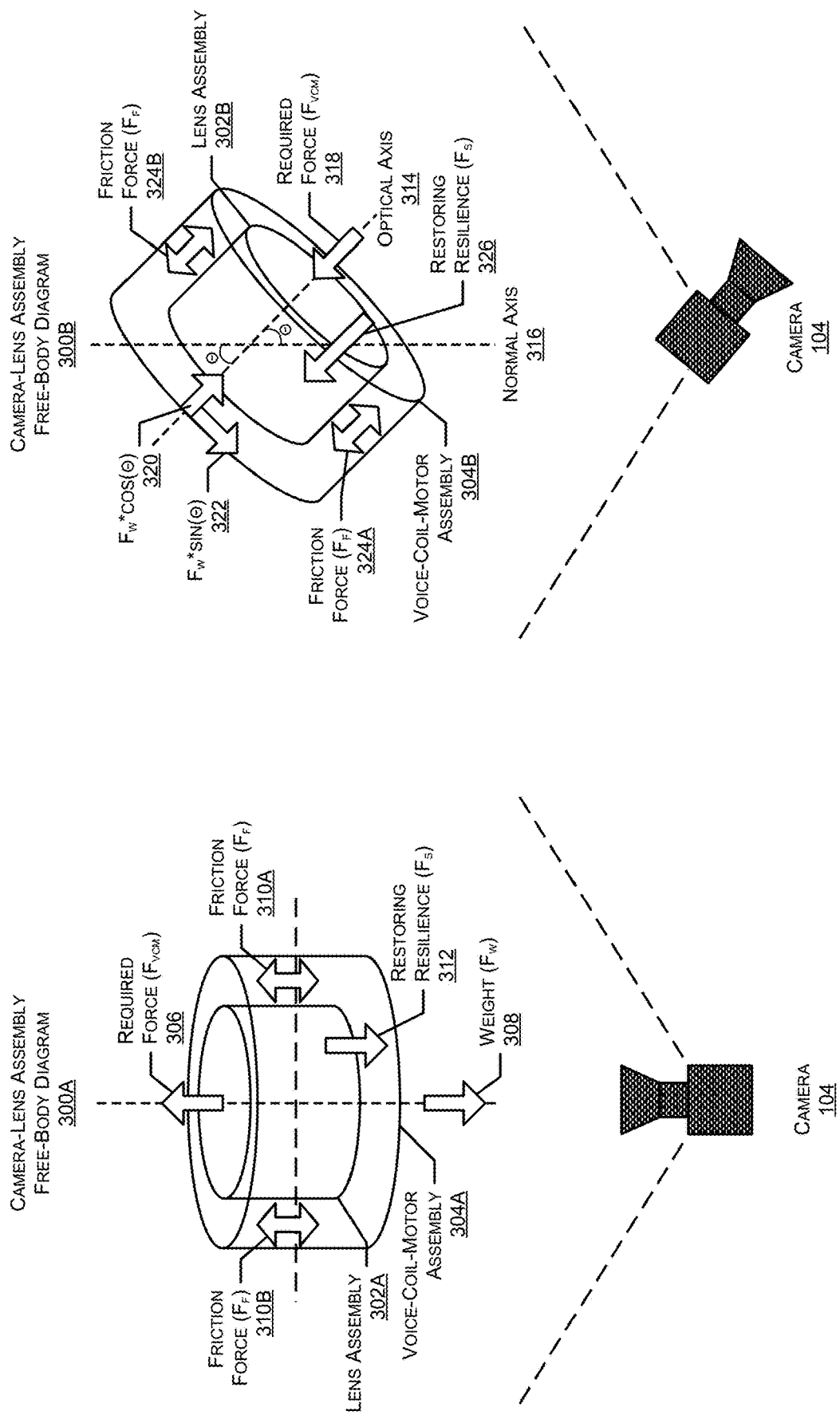
FIGS. 3A-B illustrate example free-body diagrams of orientations of a camera-lens assembly of a camera.

FIGS. 3A and 3B illustrate example free-body diagrams of orientations of a camera-lens assembly of a camera.

FIG. 3A illustrates an example of a camera-lens assembly free-body diagram 300A during calibration, where the diagram 300A which includes a depiction of a lens assembly 302A and a voice-coil-motor assembly 304A (collectively the camera-lens assembly 162). As illustrated, the camera 204 may be oriented when calibrated such that a zero-degree orientation of the camera is pointed up and against gravity, or at the direction traditionally at 90° on a unit circle. In the calibrated orientation, the force ($F_{vcm}$) to place the camera-lens assembly 162 the appropriate distance from the image sensor is oriented in a vertical direction. In this orientation, the primary forces that may be counteracted to place the lens assembly 302A the appropriate distance from the image sensor are the weight ($F_w$) 308 due to the gravitational force acting on the camera-lens assembly 162, the force of friction ($F_f$) 310A and 310B from the walls of a lens housing, and the restoring resilience force ($F_s$) 312, which is the force due to one or more suspension springs of the camera-lens assembly 162. To achieve a desired image distance, the voice-coil motor 136 may be provided with the appropriate amount of input current to create an electro-magnetic force ($F_{vcm}$) 306 to counteract these forces and place the lens assembly the appropriate distance from the image sensor. Accordingly, the force generated by the voice-coil motor may be defined by Equation 2, reproduced below:

$$F_{vcm}=F_w+F_f+F_s \qquad \text{(Equation 2)}$$

In some examples, a tilt-compensation model 140 may be created or generated for the camera 104 which models the focus behavior of the camera 104 when subjected to various orientations. Depending on the exact configuration, type, and placement of the camera, certain assumptions may be made to generate the tilt-compensation model 140 to approximate changes in input current to compensate for changes in focal length caused by a change in orientation of the camera 104. In various examples, the manufacturer of the camera or operator of the camera may calibrate the camera either prior to installation, or after installation, to determine calibrated input current values for the voice-coil motor to maintain a desired object distance and DOF for different calibrated orientation values.

As shown in the camera-lens assembly free-body diagram 300B of FIG. 3B, the camera 104 may be placed at one or more calibrated orientations, and for each of the one or more calibrated orientations, calibrated input current values to maintain the desired object distance and DOF may be determined. The lens assembly 302B and voice-coil-motor assembly 304B may be oriented on an optical axis 314, rather than the normal axis 316. The lens assembly 302B may have an orientation change defined by θ, which may correspond to $\theta_{roll}$ for the camera 104. Due to the tilt of the camera-lens assembly 162 shown by the camera-lens assembly free-body diagram 300B, the force ($F_{vcm}$) 318 may be resolved into two force components, such as a first force component $F_w*\cos(\theta)$ 320 which runs along the optical axis 314, and a second force component $F_w*\sin(\theta)$ 322 which is perpendicular to the first force component 320. Further, the camera-lens assembly 162 may experience the force of friction ($F_f$) 324A and 324B from the walls of a lens housing, and also the restoring resilience force ($F_s$) 326 which is the force due to one or more suspension springs of the camera-lens assembly 162.

To determine the relationship between the calibrated orientation values and calibrated current values, the orientation sensor(s) 126 may be used to track and store the various orientation values, and the corresponding calibrated current values to maintain a desired object distance of the camera 104 may also be tracked and stored. In some examples, depending on the camera 104, various assumptions and/or calculations may be made. For instance, when analyzing the relationship between the calibrated orientation values and the calibrated current values, it may be determined that the restoring resilience force 318 is considered a constant in that the one or more suspension springs will be associated with relatively the same amount of force to restore reliance to regardless of the orientation. Similarly, the force due to friction 324A and 324B between the camera-lens assembly 162 and the lens housing is generally negligible as the camera 104 may be designed to have low amounts of friction to reserve power. Accordingly, the force 318 from the voice-coil motor 136 is approximately equivalent to the first force component $F_w*\cos(\theta)$ 320 of the weight of the camera-lens assembly 162 caused by the force of gravity, where the first force component $F_w*\cos(\theta)$ 320 may be parallel to the optical axis 314 of the camera lens.

In some examples, further analysis may be performed to model the behavior of input current received by the voice-coil motor 136 to maintain a desired image distance despite changes in orientation. For instance, it may be determined that certain changes in orientation do not affect the force from the weight of the camera 104 for which the voice-coil motor 136 is to compensate. For example, the camera 104 may be fixed or positioned such that the weight of the camera 104 due to gravity is only affected by changes in the roll angle of the camera 104 relative to the zero-degree orientation of the camera 104, or the normal axis 316. Accordingly, when the orientation of the camera 104 is changed, the input current to compensate for the change in orientation may be substantially proportional to the roll angle of the camera 104. Based on the one or more calibration orientations and the one or more calibrated input current values, the new input current value for the voice-coil motor 136 may be defined as being proportional to the roll angle ($\theta_{roll}$), where the roll angle is defined with respect to the zero-degree calibrated orientation of the camera 104. In some examples, the tilt-compensation model 140 may define the relationship between change in orientation of the camera 104 and the input current to maintain the focal length of the camera lens using the following equation:

$$DAC_{roll} = (DAC_{cal} * ((\cos \theta_{roll}) + 2))/3 \quad \text{(Equation 3)}$$

Accordingly, based on calibrated orientation values and calibrated input current values, the tilt-compensation model 140 may be created, which generally defines the relationship between a change in orientation of the camera 104 and the input current to maintain an object distance of the camera 104.

Figure 4:
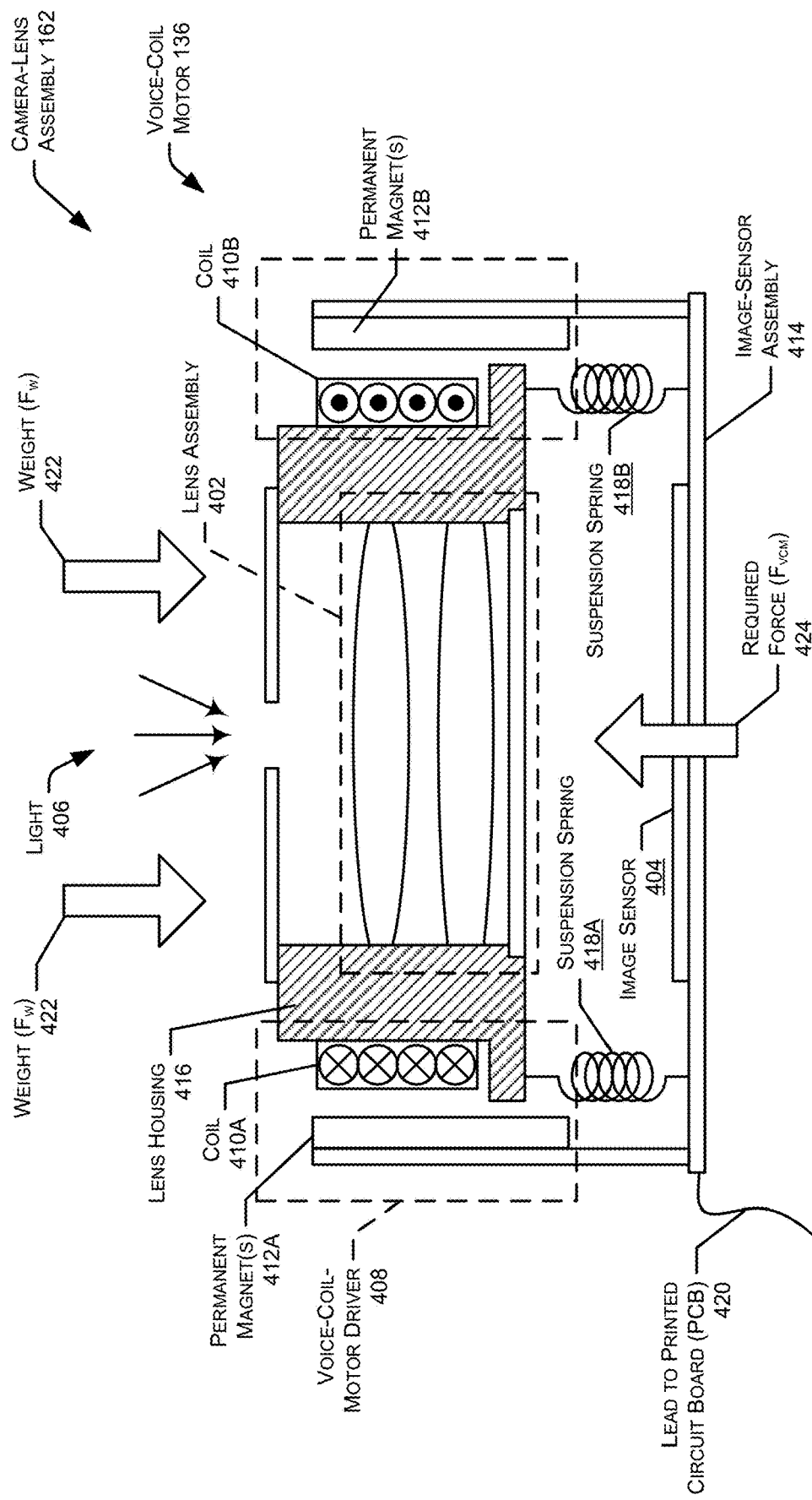
FIG. 4 illustrates components of an example camera-lens assembly including a lens assembly and a voice-coil motor.

FIG. 4 illustrates components of an example camera-lens assembly 162 including a lens assembly 402 and the voice-coil motor 136. The camera-lens assembly 162 may include, or be associated with the lens assembly 402, an image sensor 404 to capture light 406, and a voice-coil-motor drive 408. The lens assembly 402 may include any number of lens elements (e.g., 1, 3, 5, 10, etc.) configured to treat or process light 406, such as by zooming, filtering, and so forth. Depending on the design, the elements of the lens assembly 402 may both diverge and converge light to focus it onto the image sensor 404, which may comprise a photosensitive surface which re-assembles the light 406 reflecting from the scene that has passed through the lens assembly 402, resulting in an image of the environment represented by the light 406.

In various examples, a voice-coil-motor driver 408 may drive the voice-coil motor 136 based on input current provided to the coils 410A and 410B of the voice-coil motor 136. For instance, the voice-coil-motor driver 408 may receive an indication from the focus component 144 to provide an input current to the voice-coil motor 136 in order to produce a magnetic field which reacts with permanent magnets 412A and 412B to cause an image distance between the lens assembly 402 and the image sensor 404 to change according to a desired object distance. Depending on the configuration of the camera-lens assembly 162, the voice-coil motor 136 may cause an image-sensor assembly 414, which includes the image sensor 404, to move relative to a fixed lens assembly 402 to adjust the image distance of the camera-lens assembly 162. In other examples, the voice-coil motor 136 may cause the lens assembly 402 to move relative to a fixed image sensor 404 to adjust the image distance.

In some examples, the camera-lens assembly 162 may further include one or more suspension springs 418A and 418B. Depending on the configuration of the camera-lens assembly 162, the suspension springs 418A and 418B may be biased towards pulling the lens assembly 402 towards the image sensor 404, while in other examples, the suspension springs 418A and 418B may be biased to hold the lens assembly 402 in a neutral position in the lens housing 416. In either arrangement, the techniques described herein may similarly be applied to adjust the input current to the voice-coil motor to overcome the "lift-off" current, caused by the restoring resilience force ($F_s$), which may be defined as the product of a spring constant of the suspension springs 418A and 418B and displacement of the springs 418A and 418B. In some examples, the restoring resilience force may be relatively small, and even negligible. For instance, to save power for the camera 104, the springs 418A and 418B may comprise relatively weak springs (e.g., "leaf" springs) to reduce the amount of input current needed to actuate them and overcome the initial bias (e.g., lift-off current) to position the lens assembly 402 for the desired image distance. In various examples, the image-sensor assembly 414 may be coupled to a lead to a printed circuit board (PCB) 420 to pass image data from the image sensor 404 to components of the camera 104 for processing and/or transmission.

As illustrated in FIG. 4 the force due to the weight 422 of the lens assembly 402 may be acting in the direction of the gravitational force, and the force 424 generated by the voice-coil motor 136 may counteract the force due to weight 422 and place the lens assembly 402 at a position relative to the image sensor 404 to achieve a desired image distance for the camera-lens assembly 162. To accomplish this, the voice-coil-motor driver 408 may provide input current to the voice-coil motor 136 in order to create an electro-magnetic force defining the force 424. Generally, the strength of the electro-magnetic force created by the voice-coil motor 136 is directly proportional to input current. Using this direct proportionality, input current to the voice-coil motor 136 provided by the voice-coil-motor driver 408 may be used as a mechanism for controlling the image distance of the camera-lens assembly 162 (e.g., moving the image sensor relative to the lens assembly, moving the lens assembly relative to the image sensor, etc.).

FIGS. 5A-7 illustrate flow diagrams of example processes for compensating for changes in a depth of field of a camera caused by changes in orientation of the camera and changes in the temperature of the camera. While many of the techniques described herein have been in reference to the voice-coil motor 136, the techniques are also equally applicable to any type of motor, or actuator, that is usable or configurable to control the movement of components (e.g., image sensor assembly 414, lens assembly 402, image sensor 404, camera-lens assembly 162) using one or more of input voltages and/or input currents. For example, the techniques may be similarly applied using input voltages and/or input currents, and for any type of motor or actuator (e.g., linear voice-coil motors, solenoids, linear actuators, etc.) that are usable or configurable to move components based on input voltages and/or input currents.

Figure 5A:
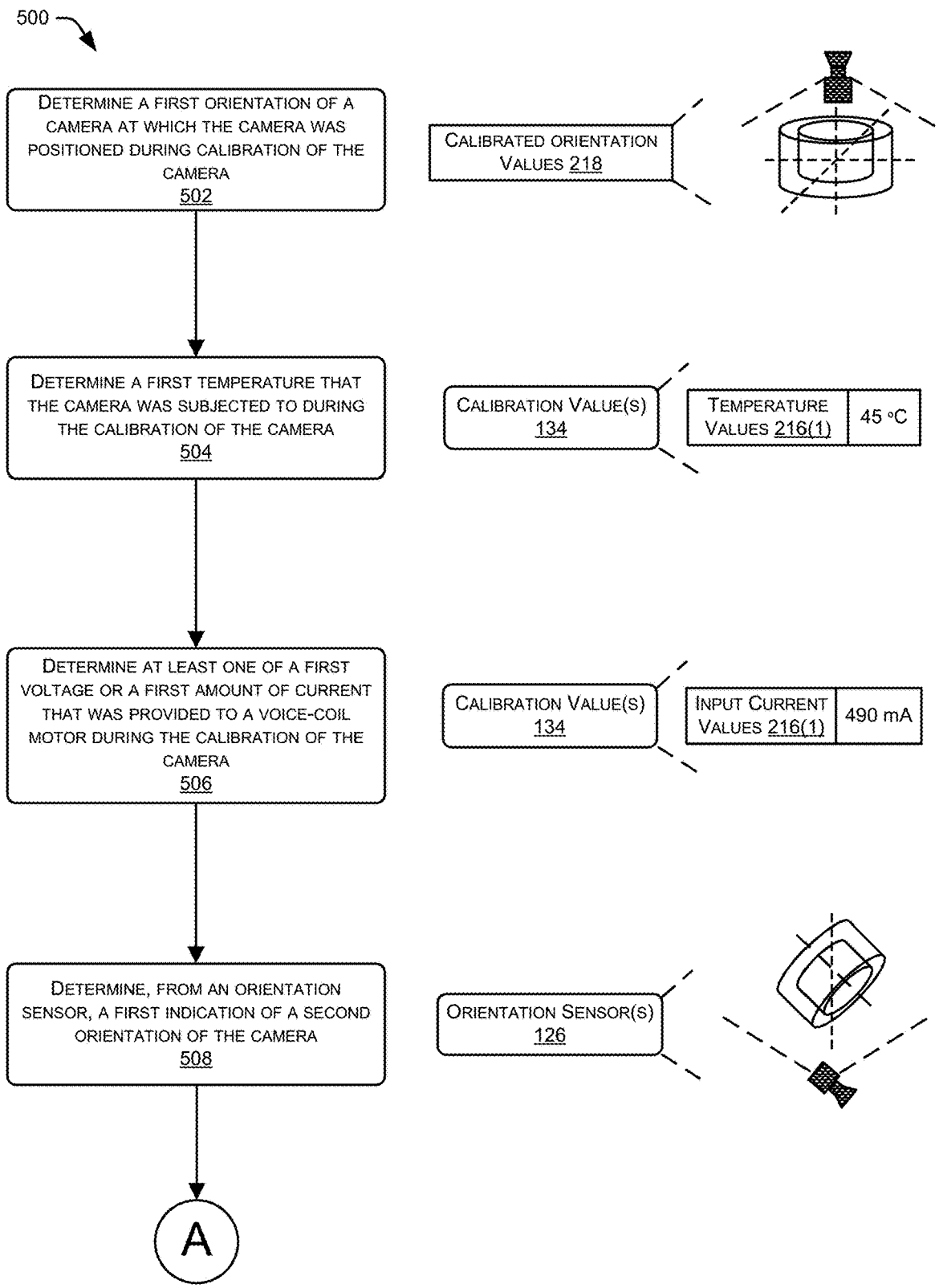
FIGS. 5A-B collectively illustrate a flow diagram of an example process for compensating for changes in a depth of field of a camera caused by changes in orientation of the camera and changes in the temperature of the camera.
Figure 5B:
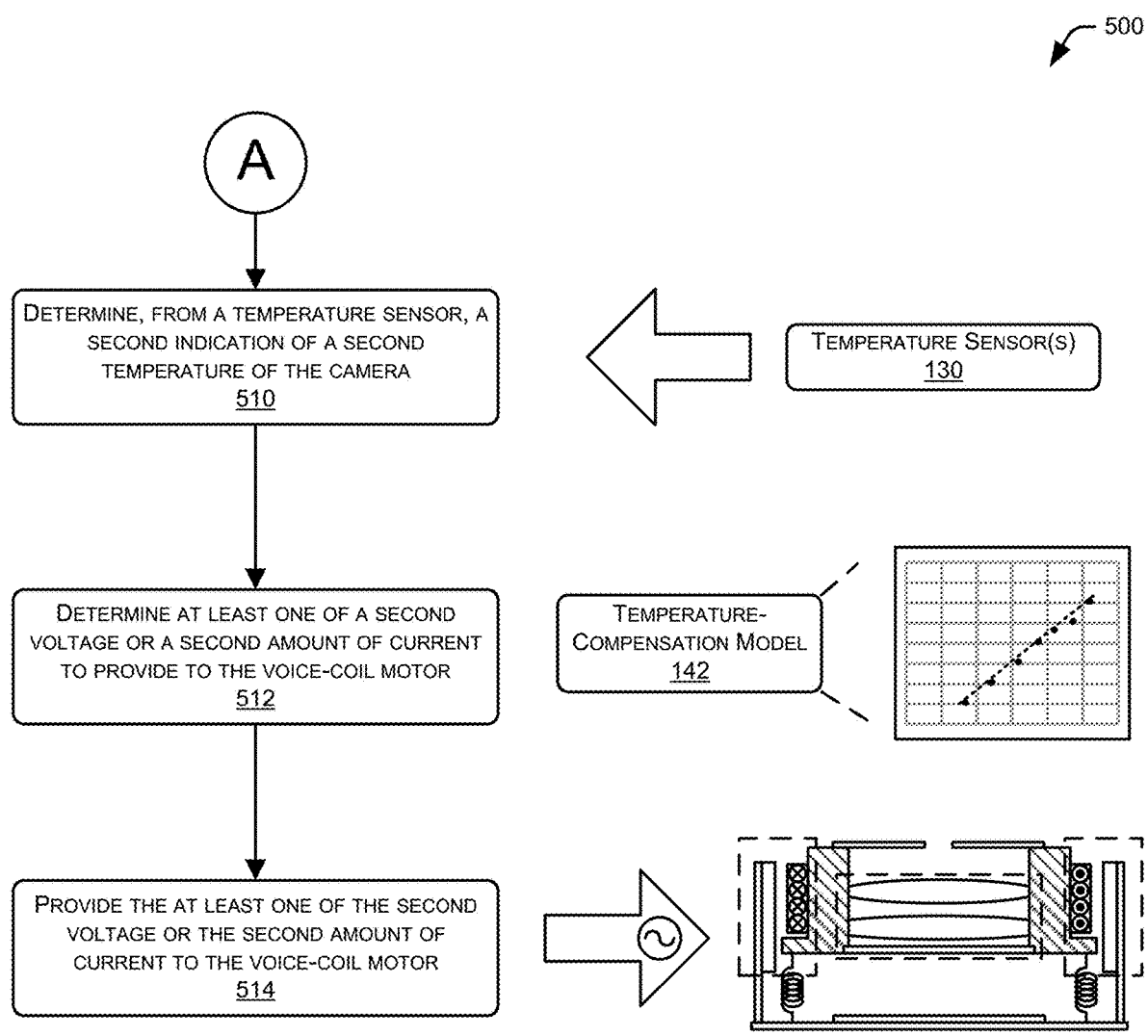

FIGS. 5A-B collectively illustrate a flow diagram of an example process 500 for compensating for changes in a depth of field of a camera caused by changes in orientation of the camera, and also by changes in the temperature of the camera. In some examples, the operations performed in process 500 may be performed by software, firmware, and/or hardware components of a camera, such as the camera 104. Although some or all of the components of camera 104 are illustrated as being internal to the camera 104, in some examples various components may be part of a system including the camera 104. For instance, various sensors utilized in process 500 may be communicatively coupled to the camera 104, and may not necessarily be internal to the camera 104 depending on the configuration of the system including the camera 104.

At 502, the focus component 144 may determine a first orientation of the camera 104 at which the camera 104 was positioned during calibration of the camera 104. In some examples, the manufacturer and/or operator of the camera 104 may calibrate and/or test the camera 104 to identify calibrated orientations of the camera 104. The calibrated orientations may be stored in memory of the camera 104, such as non-volatile memory, prior to installation at a location of the operator.

At 504, the focus component 144 may determine a first temperature that the camera was subjected to during the calibration of the camera. As described above, the manufacturer and/or operator of the camera 104 may, prior to installation, perform calibration on the camera at one or more differing temperatures. In this way, a relationship between temperature and input current for a motor 136 of the camera to maintain a desired object distance and/or depth of field may be determined or modeled.

At 506, the focus component 144 may determine at least one of a first voltage or a first amount of current that was provided to the voice-coil motor 136 during the calibration of the camera 104. In some examples, the camera 104 may be positioned at the calibrated orientation, subjected to a calibrated temperature, and receiving a calibrated voltage and/or a calibrated amount of current (e.g., at least one of a first voltage or a first amount of current). These calibrates values, which may be stored at the camera, may cause the voice-coil motor 136 to position the lens assembly 402 at a first image distance away from the image sensor 404 such that the camera 104 was focused at a second object distance during the calibration. In various examples, steps 504 and 506 may be performed for different temperatures to determine pairs of calibrated temperatures and corresponding calibrated voltages and/or amounts of current to maintain the first image distance of the camera lens assembly 162.

At 508, the focus component 144 may determine, from an orientation sensor 126 associated with the camera 104, a first indication of a second orientation of the camera 104. For instance, the focus component 144 may periodically obtain and/or receive data from the orientation sensor 126, and may further determine whether more than a threshold change in orientation has occurred relative to a previous recorded orientation. In some examples, the change in orientation may be small enough that the amount of current need not be changed. However, if more than a threshold amount of change in orientation of the camera 104 has occurred, the focus component 144 may determine that a new voltage and/or amount of input current to maintain the desired object distance and/or depth of field.

At 510, the focus component 144 may determine, from a temperature sensor 130 associated with the camera 104, a second indication of a second temperature of the camera 104. For instance, the focus component 144 may periodically obtain data from the temperature sensor 130, and may further determine whether more than a threshold change in temperature has occurred relative to a previous recorded temperature. In some examples, the change in temperature may be small enough that voltage and/or the amount of current need not be changed. However, if more than a threshold amount of change in temperature of the camera 104 has occurred, the focus component 144 may determine that a new voltage and/or amount of input current to maintain the desired object distance and/or depth of field.

At 512, the focus component 144 may determine, based at least in part on the first orientation, the second orientation, the first temperature, the second temperature, and the at least one of the first voltage or the first amount of current, at least one of a second voltage or a second amount of current to provide to the voice-coil motor 136. As described herein, the change in the voltage and/or amount of current provided to the voice-coil motor 136 may be based solely on a change in temperature and only using the temperature-compensation model 142, based solely on a change in orientation and only using the tilt-compensation model 140, or a combination of both.

In instances where changes in both orientation and temperature occur that may be compensated by changes in input current, various operations may be performed. The focus component 144 may obtain the calibrated current ($DAC_{cal}$) used during calibration, and further determine the roll orientation angle ($\theta_{roll}$) from the accelerometer. The focus component 144 may then determine the current to compensate for the change in orientation using Equation 3, reproduced below:

$$DAC_{roll}=(DAC_{cal}*((\cos \theta_{roll})+2))/3 \quad \text{(Equation 3)}$$

After obtaining the $DAC_{roll}$ value to compensate for object distance changes due to the change in orientation of the camera 104, the focus component 144 may use the temperature-compensation model 142 to compensate for object distance changes due to changes in temperature. The focus component 144 obtains the current temperature, as well as the calibrated temperature, to determine the current to provide to the motor 136. For example, the focus component 144 may determine the current to compensate for the change in temperature using Equation 4, shown below:

$$DAC_{roll\_temp}=DAC_{roll}*(k_{temp}(t_{in}-t_{cal})) \quad \text{(Equation 4)}$$

Thus, the focus component 144 may compensate for changes in object distance and depth of field caused by changes in orientation as well as changes in temperature of the camera 104.

At 514, the focus component 144 may provide the at least one of the second voltage or the second amount of current (e.g., $DACr_{roll\_temp}$) to the voice-coil motor 136 to position the lens assembly 402 at a second image distance away from the image sensor 404 such that the camera 104 is focused for the second object distance. For example, the focus component 144 may send a digital signal to a digital-to-analog converter, which may be associated with a voice-coil-motor driver 408, to provide alternating current to the voice-coil motor 136.

Figure 6:
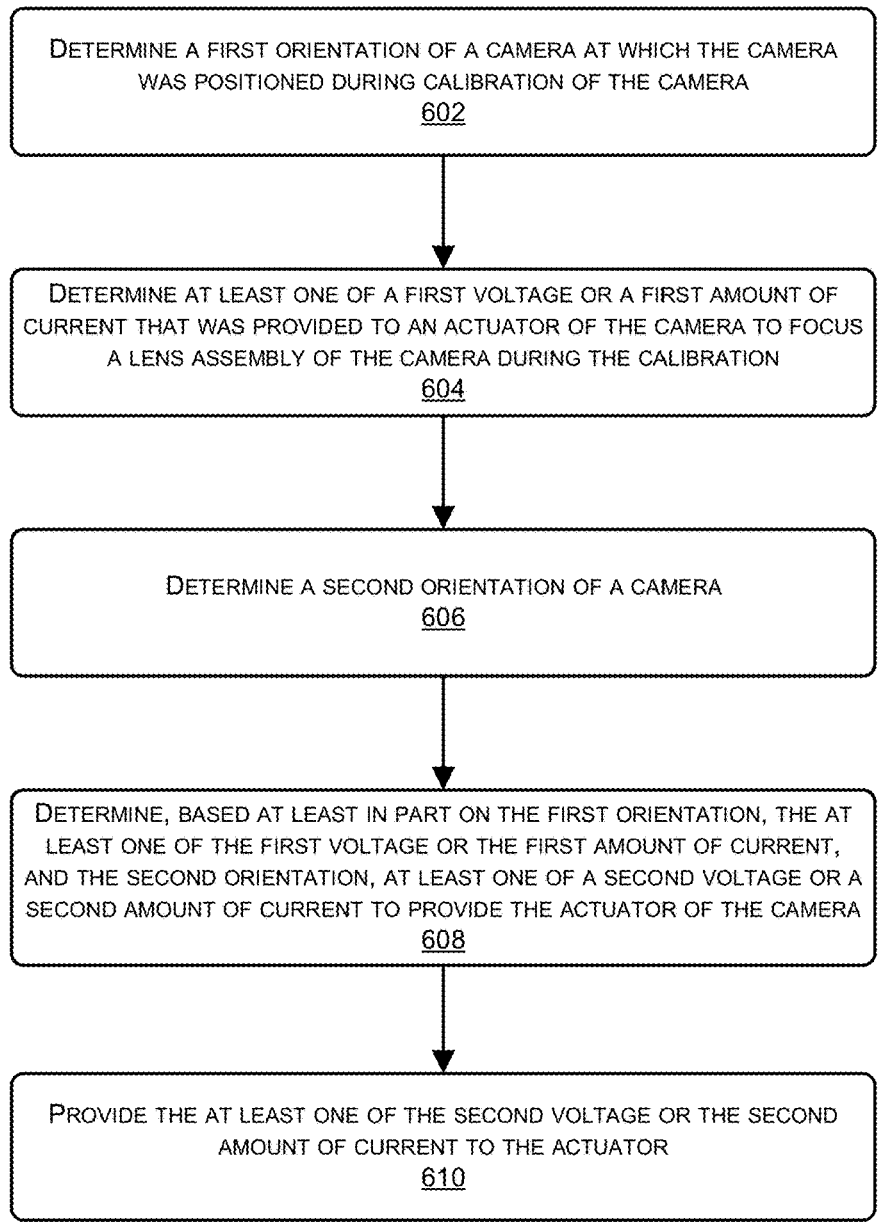
FIG. 6 illustrates a flow diagram of an example process for compensating for changes in a depth of field of a camera caused by changes in orientation of the camera.

FIG. 6 illustrates a flow diagram of an example process 600 for compensating for changes in a depth of field of a camera 104 caused by changes in orientation of the camera 104.

At 602, a focus component 144 may determine a first orientation of the camera 104 at which the camera 104 was positioned during calibration of the camera 104. For instance, the focus component 144 may read calibration value(s) 134 from memory 132.

At 604, the focus component 144 may determine at least one of a first voltage or a first amount of current that was provided to an actuator (e.g., voice-coil motor 136) of the camera 104 to focus a lens assembly 162 of the camera 104 during calibration. In some examples, the focus component 144 may read the calibration value(s) 134 stored in memory 132 to determine the at least one of the first voltage or the first amount of current that was provided to the actuator during calibration.

At 606, the focus component 144 may determine a second orientation of the camera 104. In some examples, the focus component 144 may obtain the indication of the second orientation of the camera 104 from the orientation sensor(s) 126 of the camera 104.

In various examples, prior to receiving the indication of the second orientation, the focus component 144 may have received and stored an additional indication of a previous orientation of the camera. The focus component 144 may determine whether a threshold amount of time has passed since receiving the additional indication of the previous orientation of the camera 104. At least partly responsive to determining that more than the threshold amount of time has passed since receiving the additional indication of the previous orientation, the focus component 144 may determine to receive or obtain the indication of the second orientation of the camera 104.

At 608, the focus component 144 may determine, based at least in part on the first orientation, the at least one of the first voltage or the first amount of current, and the second orientation, at least one of a second voltage or a second amount of current to provide to the actuator. In some examples, the at least one of the second voltage or the second amount of current causes the actuator to adjust the position of the at least one of the lens assembly 402 or the image sensor 404 to change an image distance of the camera 104.

In some examples, the focus component 144 may determine whether a previous orientation of the camera 104 changed by more than a threshold change in orientation with respect to the second orientation (e.g., 1 degree, 5 degrees, etc.). If the focus component 144 determines that the change in orientation between the second orientation and the previous orientation is greater than or equal to a threshold change in orientation, the focus component 144 may determine the at least one of the second voltage or the second amount of current at least partly responsive to determining that the change in orientation between the second orientation and the previous orientation is greater than or equal to the threshold change in orientation.

At 610, the focus component 144 may provide the at least one of the second voltage or the second amount of current to the actuator. For instance, the focus component 144 may provide an indication of the at least one of the second voltage or the second amount of current to the voice-coil-motor driver 408.

Figure 7:
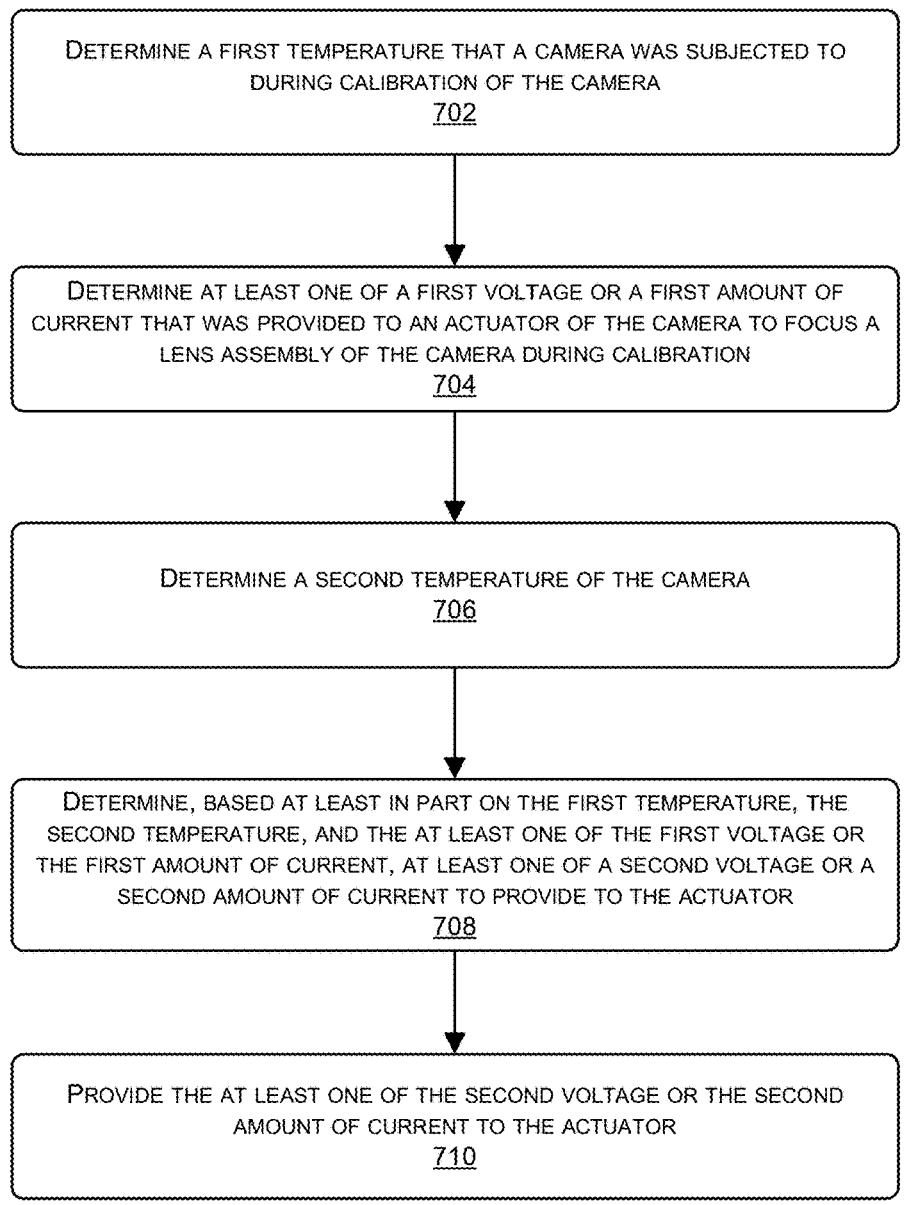
FIG. 7 illustrates a flow diagram of an example process for compensating for changes in a depth of field caused by changes in the temperature of the camera.

FIG. 7 illustrates a flow diagram of an example process 700 for compensating changes in the temperature of the camera 104.

At 702, the focus component 144 may determine a first temperature that a camera 104 was subjected to during calibration of the camera 104. For instance, the focus component 144 may read calibration value(s) 134 from memory 132.

At 704, the focus component 144 may determine at least one of a first voltage or a first amount of current that was provided to an actuator (e.g., voice-coil motor 136) of the camera 104 to focus a lens assembly 402 of the camera 104 during the calibration. In some examples, the focus component 144 may read the calibration value(s) 134 stored in memory 132 to determine the at least one of the first voltage or the first amount of current that was provided to the actuator during calibration.

At 706, the focus component 144 may determine a second temperature of the camera 104. In some examples, the focus component 144 may obtain the indication of the second temperature of the camera 104 from the temperature sensor(s) 130 of the camera 104.

In various examples, prior to receiving the indication of the second temperature, the focus component 144 may have received and stored an additional indication of a previous temperature of the camera. The focus component 144 may determine whether a threshold amount of time has passed since receiving the additional indication of the previous temperature of the camera. At least partly responsive to determining that more than the threshold amount of time has passed since receiving the additional indication of the previous temperature, the focus component 144 may determine to receive or obtain the indication of the second temperature of the camera 104.

At 708, the focus component 144 may determine, based at least in part on the first temperature, the second temperature, and the at least one of the first voltage or the first amount of current, at least one of a second voltage or a second amount of current to provide to the actuator. In some examples, the second amount of current causes the actuator to adjust the position of the at least one of the lens assembly 402 or the image sensor 404 to change an image distance of the camera 104.

In some examples, the focus component 144 may determine whether a previous temperature of the camera changed by more than a threshold change in temperature with respect to the second temperature (e.g., 1 degree, 5 degrees, etc.). If the focus component 144 determines that the change in temperature between the second temperature and the previous temperature is greater than or equal to a threshold change in temperature, the focus component 144 may determine second amount of current at least partly responsive to determining that the change in temperature between the second temperature and the previous temperature is greater than or equal to the threshold change in temperature.

At 710, the focus component 144 may provide the at least one of the second voltage or the second amount of current to the actuator. For instance, the focus component 144 may provide an indication of the at least one of the second voltage or the second amount of current to the voice-coil-motor driver 408.

The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

Figure 8:
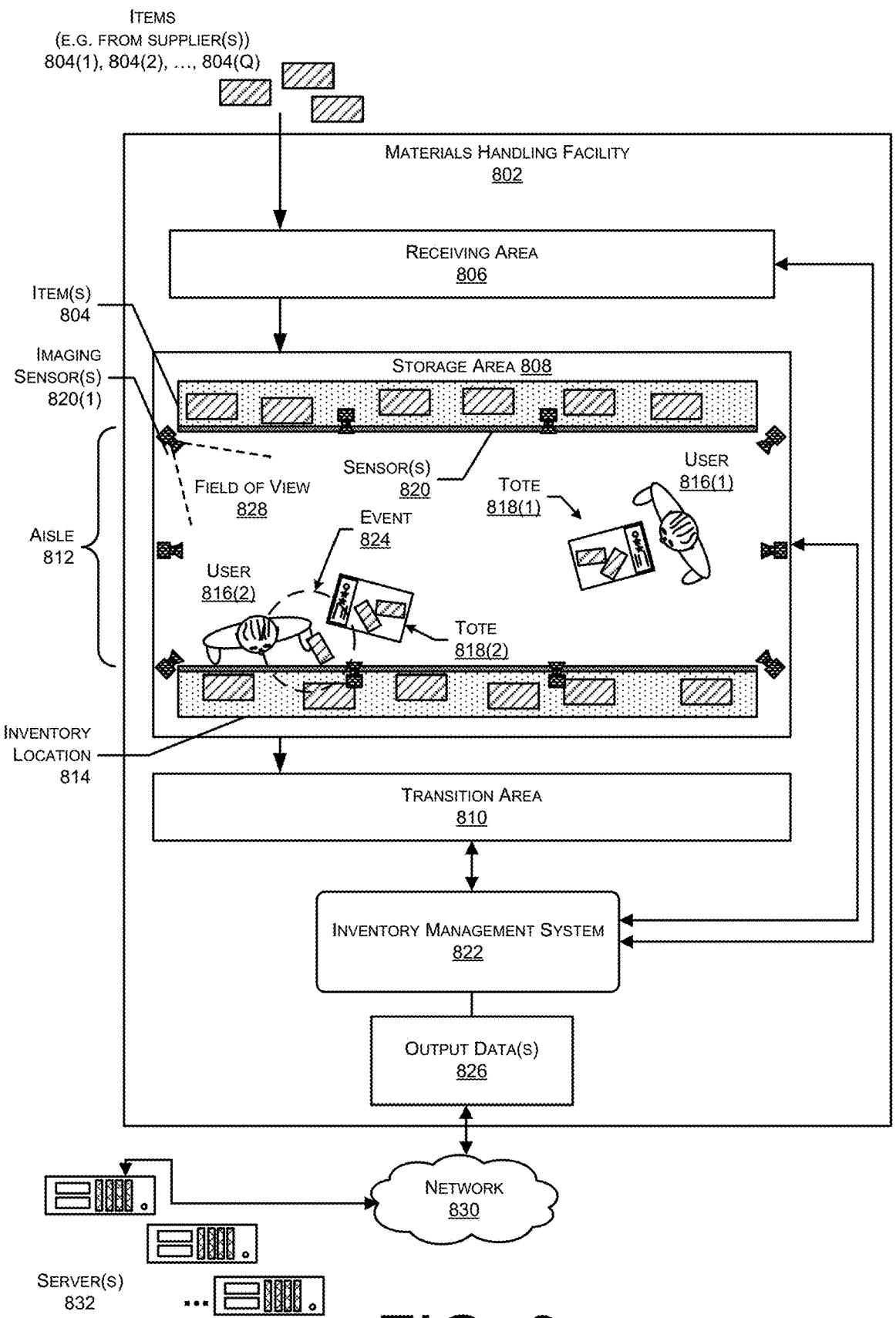
FIG. 8 is a block diagram of an example materials handling facility that includes sensors and an inventory management system configured to generate output regarding events occurring in the facility using the sensor data.
Figure 9:
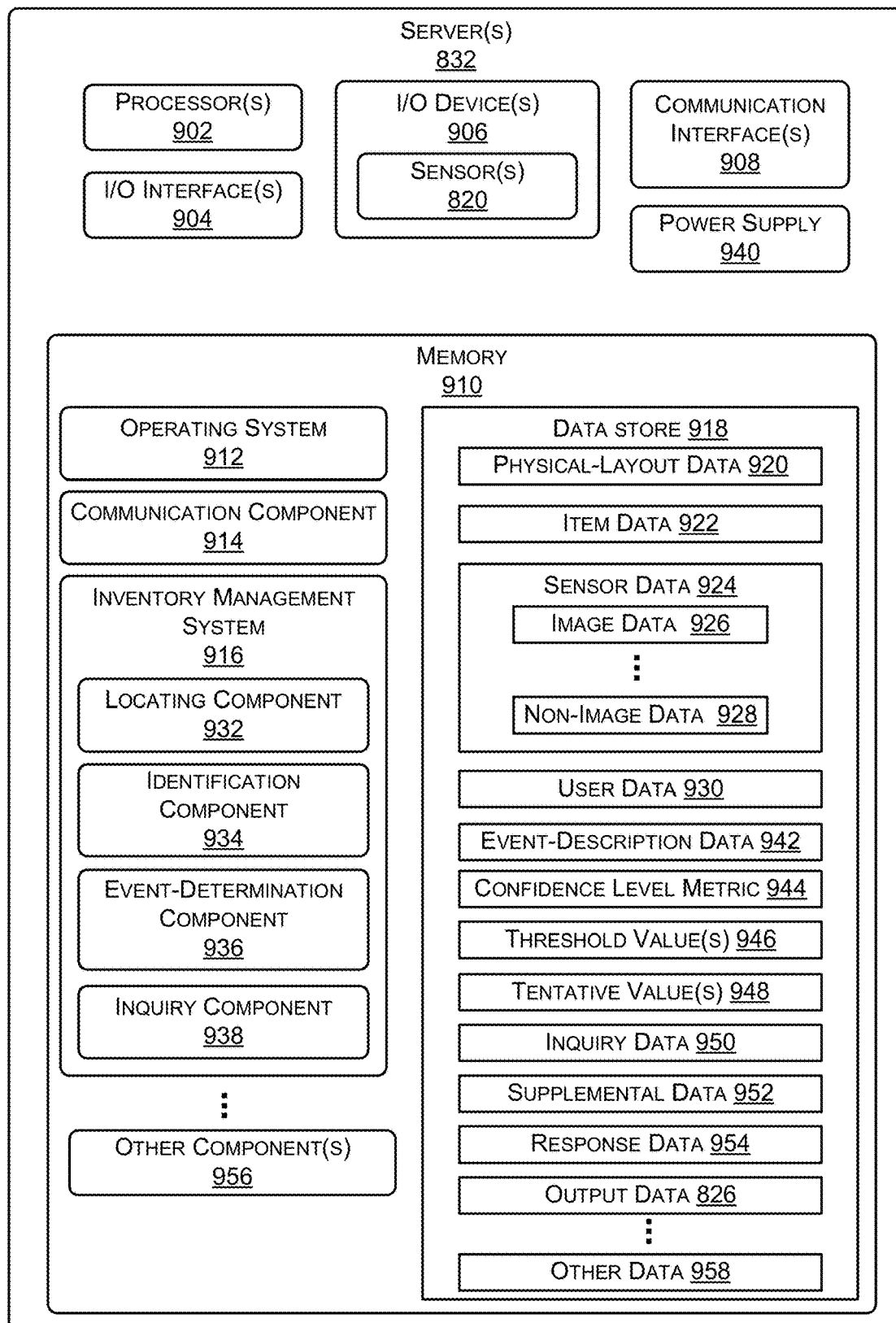
FIG. 9 illustrates a block diagram of one or more servers configured to support operation of the facility.

FIGS. 8 and 9 represent an illustrative materials handing environment, such as the materials handling facility 102, in which the techniques described herein may be applied to cameras monitoring the environments as described below. However, the following description is merely one illustrative example of an industry and environment in which the techniques described herein may be utilized.

An implementation of a materials handling system 802 configured to store and manage inventory items is illustrated in FIG. 8. A materials handling facility 802 (facility) comprises one or more physical structures or areas within which one or more items 804(1), 804(2), . . . , 804(Q) (generally denoted as 804) may be held. As used in this disclosure, letters in parenthesis such as "(Q)" indicate an integer result. The items 804 comprise physical goods, such as books, pharmaceuticals, repair parts, electronic gear, groceries, and so forth.

The facility 802 may include one or more areas designated for different functions with regard to inventory handling. In this illustration, the facility 802 includes a receiving area 806, a storage area 808, and a transition area 810. The receiving area 806 may be configured to accept items 804, such as from suppliers, for intake into the facility 802.

For example, the receiving area 806 may include a loading dock at which trucks or other freight conveyances unload the items 804.

The storage area 808 is configured to store the items 804. The storage area 808 may be arranged in various physical configurations. In one implementation, the storage area 808 may include one or more aisles 812. The aisle 812 may be configured with, or defined by, inventory locations 814 on one or both sides of the aisle 812. The inventory locations 814 may include one or more of shelves, racks, cases, cabinets, bins, floor locations, or other suitable storage mechanisms for holding or storing the items 804. The inventory locations 814 may be affixed to the floor or another portion of the facility's structure, or may be movable such that the arrangements of aisles 812 may be reconfigurable. In some implementations, the inventory locations 814 may be configured to move independently of an outside operator. For example, the inventory locations 814 may comprise a rack with a power source and a motor, operable by a computing device to allow the rack to move from one location within the facility 802 to another.

One or more users 816(1), 816(2), . . . , 816(U), totes 818(1), 818(2), . . . , 818(T) (generally denoted as 818) or other material handling apparatus may move within the facility 802. For example, the users 816 may move about within the facility 802 to pick or place the items 804 in various inventory locations 814, placing them on the totes 818 for ease of transport. An individual tote 818 is configured to carry or otherwise transport one or more items 804. For example, a tote 818 may include a basket, a cart, a bag, and so forth. In other implementations, other agencies such as robots, forklifts, cranes, aerial drones, and so forth, may move about the facility 802 picking, placing, or otherwise moving the items 804.

One or more sensors 820 may be configured to acquire information in the facility 802. The sensors 820 in the facility 802 may include sensors fixed in the environment (e.g., ceiling-mounted cameras) or otherwise, such as sensors in the possession of users (e.g., mobile phones, tablets, etc.). The sensors 820 may include, but are not limited to, cameras 820(1), weight sensors, radio frequency (RF) receivers, temperature sensors, humidity sensors, vibration sensors, and so forth. The sensors 820 may be stationary or mobile, relative to the facility 802. For example, the inventory locations 814 may contain cameras 820(1) configured to acquire images of pick or placement of items 804 on shelves, of the users 816(1) and 816(2) in the facility 802, and so forth. In another example, the floor of the facility 802 may include weight sensors configured to determine a weight of the users 816 or other object thereupon.

During operation of the facility 802, the sensors 820 may be configured to provide information suitable for identifying new locations of objects or other occurrences within the facility 802. For example, a series of images acquired by a camera 820(1) may indicate removal of an item 804 from a particular inventory location 814 by one of the users 816 and placement of the item 804 on or at least partially within one of the totes 818.

While the storage area 808 is depicted as having one or more aisles 812, inventory locations 814 storing the items 804, sensors 820, and so forth, it is understood that the receiving area 806, the transition area 810, or other areas of the facility 802 may be similarly equipped. Furthermore, the arrangement of the various areas within the facility 802 is depicted functionally rather than schematically. For example, multiple different receiving areas 806, storage areas 808, and transition areas 810 may be interspersed rather than segregated in the facility 802.

The facility 802 may include, or be coupled to, an inventory management system 822. The inventory management system 822 is configured to identify interactions with and between users 816, devices such as sensors 820, robots, material handling equipment, computing devices, and so forth, in one or more of the receiving area 806, the storage area 808, or the transition area 810. These interactions may include one or more events 824. For example, events 824 may include the entry of the user 816 to the facility 802, stocking of items 804 at an inventory location 814, picking of an item 804 from an inventory location 814, returning of an ITEM 804 to an inventory location 814, placement of an item 804 within a tote 818, movement of users 816 relative to one another, gestures by the users 816, and so forth. Other events 824 involving users 816 may include the user 816 providing authentication information in the facility 802, using a computing device at the facility 802 to authenticate identity to the inventory management system 822, and so forth. Some events 824 may involve one or more other objects within the facility 802. For example, the event 824 may comprise movement within the facility 802 of an inventory location 814, such as a counter mounted on wheels. Events 824 may involve one or more of the sensors 820. For example, a change in operation of a sensor 820, such as a sensor failure, change in alignment, and so forth, may be designated as an event 824. Continuing the example, movement of a camera 820(1) resulting in a change in the orientation of the field of view 828 (such as resulting from someone or something bumping the camera 820(1)) (e.g. camera 104) may be designated as an event 824.

By determining the occurrence of one or more of the events 824, the inventory management system 822 may generate output data 826. The output data 826 comprises information about the event 824. For example, where the event 824 comprises an item 804 being removed from an inventory location 814, the output data 826 may comprise an item identifier indicative of the particular item 804 that was removed from the inventory location 814 and a user identifier of a user that removed the item.

The inventory management system 822 may use one or more automated systems to generate the output data 826. For example, an artificial neural network, one or more classifiers, or other automated machine learning techniques may be used to process the sensor data from the one or more sensors 820 to generate output data 826. The automated systems may operate using probabilistic or non-probabilistic techniques. For example, the automated systems may use a Bayesian network. In another example, the automated systems may use support vector machines to generate the output data 826 or the tentative results. The automated systems may generate confidence level data that provides information indicative of the accuracy or confidence that the output data 826 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 804, user 816, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 816 may pick an item 804(1) such as a perfume bottle that is generally cubical in shape from the inventory location 814. Other items 804 at nearby inventory locations 814 may be predominately spherical. Based on the difference in shape (cube vs. sphere) from the adjacent items, and the correspondence in shape with the previously stored image of the perfume bottle item 804(1) (cubical and cubical), the confidence level that the user 104 has picked up the perfume bottle item 804(1) is high.

In some situations, the automated techniques may be unable to generate output data 826 with a confidence level above a threshold result. For example, the automated techniques may be unable to distinguish which user 816 in a crowd of users 816 has picked up the item 804 from the inventory location 814. In other situations, it may be desirable to provide human confirmation of the event 824 or of the accuracy of the output data 826. For example, some items 804 may be deemed age restricted such that they are to be handled only by users 816 above a minimum age threshold.

In instances where human confirmation is desired, sensor data associated with an event 824 may be processed to generate inquiry data. The inquiry data may include a subset of the sensor data associated with the event 824. The inquiry data may also include one or more of one or more tentative results as determined by the automated techniques, or supplemental data. The subset of the sensor data may be determined using information about the one or more sensors 820. For example, camera data such as the location of the camera 820(1) within the facility 802, the orientation of the camera 820(1), and a field of view 828 of the camera 820(1) may be used to determine if a particular location within the facility 802 is within the field of view 828. The subset of the sensor data may include images that may show the inventory location 814 or that the item 804 was stowed. The subset of the sensor data may also omit images from other cameras 820(1) that did not have that inventory location 814 in the field of view 828. The field of view 828 may comprise a portion of the scene in the facility 802 that the sensor 820 is able to generate sensor data about.

Continuing the example, the subset of the sensor data may comprise a video clip acquired by one or more cameras 820(1) having a field of view 828 that includes the item 804. The tentative results may comprise the "best guess" as to which items 804 may have been involved in the event 824. For example, the tentative results may comprise results determined by the automated system that have a confidence level above a minimum threshold.

The facility 802 may be configured to receive different kinds of items 804 from various suppliers and to store them until a customer orders or retrieves one or more of the items 804. A general flow of items 804 through the facility 802 is indicated by the arrows of FIG. 2. Specifically, as illustrated in this example, items 804 may be received from one or more suppliers, such as manufacturers, distributors, wholesalers, and so forth, at the receiving area 806. In various implementations, the items 804 may include merchandise, commodities, perishables, or any suitable type of item 804, depending on the nature of the enterprise that operates the facility 802. The receiving of the items 804 may comprise one or more events 824 for which the inventory management system 822 may generate output data 826.

Upon being received from a supplier at receiving area 806, the items 804 may be prepared for storage. For example, items 804 may be unpacked or otherwise rearranged. The inventory management system 822 may include one or more software applications executing on a computer system to provide inventory management functions based on the events 824 associated with the unpacking or rearrangement. These inventory management functions may include maintaining information indicative of the type, quantity, condition, cost, location, weight, or any other suitable parameters with respect to the items 804. The items 804 may be stocked, managed, or dispensed in terms of countable, individual units or multiples, such as packages, cartons, crates, pallets, or other suitable aggregations. Alternatively, some items 804, such as bulk products, commodities, and so forth, may be stored in continuous or arbitrarily divisible amounts that may not be inherently organized into countable units. Such items 804 may be managed in terms of measurable quantity such as units of length, area, volume, weight, time, duration, or other dimensional properties characterized by units of measurement. Generally speaking, a quantity of an item 804 may refer to either a countable number of individual or aggregate units of an item 804 or a measurable amount of an item 804, as appropriate.

After arriving through the receiving area 806, items 804 may be stored within the storage area 808. In some implementations, like items 804 may be stored or displayed together in the inventory locations 814 such as in bins, on shelves, hanging from pegboards, and so forth. In this implementation, all items 804 of a given kind are stored in one inventory location 814. In other implementations, like items 804 may be stored in different inventory locations 814. For example, to optimize retrieval of certain items 804 having frequent turnover within a large physical facility 802, those items 804 may be stored in several different inventory locations 814 to reduce congestion that might occur at a single inventory location 814. Storage of the items 804 and their respective inventory locations 814 may comprise one or more events 824.

When a customer order specifying one or more items 804 is received, or as a user 816 progresses through the facility 802, the corresponding items 804 may be selected or "picked" from the inventory locations 814 containing those items 804. In various implementations, item picking may range from manual to completely automated picking. For example, in one implementation, a user 816 may have a list of items 804 they desire and may progress through the facility 802 picking items 804 from inventory locations 814 within the storage area 808, and placing those items 804 into a tote 818. In other implementations, employees of the facility 802 may pick items 804 using written or electronic pick lists derived from customer orders. These picked items 804 may be placed into the tote 818 as the employee progresses through the facility 802. Picking may comprise one or more events 824, such as the user 816 in moving to the inventory location 814, retrieval of the item 804 from the inventory location 814, and so forth.

After items 804 have been picked, they may be processed at a transition area 810. The transition area 810 may be any designated area within the facility 802 where items 804 are transitioned from one location to another or from one entity to another. For example, the transition area 810 may be a packing station within the facility 802. When the item 804 arrives at the transition area 810, the items 804 may be transitioned from the storage area 808 to the packing station. The transitioning may comprise one or more events 824. Information about the transition may be maintained by the inventory management system 822 using the output data 826 associated with those events 824.

In another example, if the items 804 are departing the facility 802 a list of the items 804 may be obtained and used by the inventory management system 822 to transition responsibility for, or custody of, the items 804 from the facility 802 to another entity. For example, a carrier may accept the items 804 for transport with that carrier accepting responsibility for the items 804 indicated in the list. In another example, a customer may purchase or rent the items 804 and remove the items 804 from the facility 802. The purchase or rental may comprise one or more events 824.

The inventory management system 822 may access or generate sensor data about the facility 802 and the contents therein including the items 804, the users 816, the totes 818, and so forth. The sensor data may be acquired by one or more of the sensors 820, data provided by other systems, and so forth. For example, the sensors 820 may include cameras 820(1) configured to acquire image data of scenes in the facility 802. The image data may comprise still images, video, or a combination thereof. The image data may be processed by the inventory management system 822 to determine a location of the user 816, the tote 818, the identity of the user 816, and so forth. As used herein, the identity of the user may represent a unique identifier of the user (e.g., name, number associated with user, username, etc.), an identifier that distinguishes the user amongst other users being identified with the environment, or the like.

The inventory management system 822, or systems coupled thereto, may be configured to identify the user 816, as well as to determine other candidate users. In one implementation, this determination may comprise comparing sensor data with previously stored identity data. For example, the user 816 may be identified by showing their face to a facial recognition system, by presenting a token carrying authentication credentials, providing a fingerprint, scanning a barcode or other type of unique identifier upon entering the facility, and so forth. Identity of the user 816 may be determined before, during, or after entry to the facility 802. Determination of the user's 816 identity may comprise comparing sensor data associated with the user 816 in the facility 802 to previously stored user data.

In some instances, the inventory management system group users within the facility into respective sessions. That is, the inventory management system 822 may utilize the sensor data to determine groups of users that are effectively "together" (e.g., shopping together). In some instances, a particular session may include multiple users that entered the facility 802 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 818. Noting the child and the mother as belonging to the same session may increase the chances of successfully adding the box of cereal to the virtual shopping cart of the mother.

By determining the occurrence of one or more events 824 and the output data 826 associated therewith, the inventory management system 822 is able to provide one or more services to the users 816 of the facility 802. By utilizing one or more human associates to process inquiry data and generate response data that may then be used to produce output data 826, overall accuracy of the system may be enhanced. The enhanced accuracy may improve the user experience of the one or more users 816 of the facility 802. In some examples, the output data 826 may be transmitted over a network 830 to one or more servers 832.

FIG. 9 illustrates a block diagram of the one or more servers 832. The servers 832 may be physically present at the facility 802, may be accessible by the network 830, or a combination of both. The servers 832 do not require end-user knowledge of the physical location and configuration of the system that delivers the services. Common expressions associated with the servers 832 may include "on-demand computing," "software as a service (SaaS)," "platform computing," "network-accessible platform," "cloud services," "data centers," and so forth. Services provided by the servers 832 may be distributed across one or more physical or virtual devices.

The servers 832 may include one or more hardware processors 902 (processors) configured to execute one or more stored instructions. The processors 902 may comprise one or more cores. The servers 832 may include one or more input/output (I/O) interface(s) 904 to allow the processor 902 or other portions of the servers 832 to communicate with other devices. The I/O interfaces 904 may comprise Inter-Integrated Circuit (I2C), Serial Peripheral Interface bus (SPI), Universal Serial Bus (USB) as promulgated by the USB Implementers Forum, and so forth.

The servers 832 may also include one or more communication interfaces 906. The communication interfaces 906 are configured to provide communications between the servers 832 and other devices, such as the sensors 820, the interface devices, routers, and so forth. The communication interfaces 906 may include devices configured to couple to personal area networks (PANs), wired and wireless local area networks (LANs), wired and wireless wide area networks (WANs), and so forth. For example, the communication interfaces 906 may include devices compatible with Ethernet, Wi-Fi™, and so forth. The servers 832 may also include one or more busses or other internal communications hardware or software that allow for the transfer of data between the various modules and components of the servers 832.

The servers 832 may also include a power supply 940. The power supply 940 is configured to provide electrical power suitable for operating the components in the servers 832.

As shown in FIG. 4, the servers 832 includes one or more memories 910. The memory 910 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 910 provides storage of computer-readable instructions, data structures, program modules, and other data for the operation of the servers 832. A few example functional modules are shown stored in the memory 910, although the same functionality may alternatively be implemented in hardware, firmware, or as a system on a chip (SOC).

The memory 910 may include at least one operating system (OS) component 912. The OS component 912 is configured to manage hardware resource devices such as the I/O interfaces 904, the communication interfaces 306, and provide various services to applications or components executing on the processors 902. The OS component 912 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 910. These components may be executed as foreground applications, background tasks, daemons, and so forth. A communication component 914 may be configured to establish communications with one or more of the sensors 820, one or more of the devices used by associates, other servers 832, or other devices. The communications may be authenticated, encrypted, and so forth.

The memory 910 may store an inventory management system 916. The inventory management system 916 is configured to provide the inventory functions as described herein with regard to the inventory management system 822. For example, the inventory management system 916 may determine movement of items 804 in the facility 802, generate user interface data, and so forth.

The inventory management system 916 may access information stored in one or more data stores 918 in the memory 910. The data store 918 may use a flat file, database, linked list, tree, executable code, script, or other data structure to store the information. In some implementations, the data store 918 or a portion of the data store 918 may be distributed across one or more other devices including other servers 832, network attached storage devices, and so forth.

The data store 918 may include physical layout data 920. The physical layout data 920 provides a mapping of physical locations within the physical layout of devices and objects such as the sensors 820, inventory locations 814, and so forth. The physical layout data 920 may indicate the coordinates within the facility 802 of an inventory location 814, sensors 820 within view of that inventory location 814, and so forth. For example, the physical layout data 920 may include camera data comprising one or more of a location within the facility 802 of a camera 820(1), orientation of the camera 820(1), the operational status, and so forth. Continuing example, the physical layout data 920 may indicate the coordinates of the camera 820(1), pan and tilt information indicative of a direction that the field of view 828 is oriented along, whether the camera 820(1) is operating or malfunctioning, and so forth.

In some implementations, the inventory management system 916 may access the physical layout data 920 to determine if a location associated with the event 824 is within the field of view 828 of one or more sensors 820. Continuing the example above, given the location within the facility 802 of the event 824 and the camera data, the inventory management system 916 may determine the cameras 820(1) that may have generated images of the event 824.

The item data 922 comprises information associated with the items 804. The information may include information indicative of one or more inventory locations 814 at which one or more of the items 804 are stored. The item data 922 may also include order data, SKU or other product identifier, price, quantity on hand, weight, expiration date, images of the ITEM 804, detail description information, ratings, ranking, and so forth. The inventory management system 916 may store information associated with inventory management functions in the item data 922.

The data store 918 may also include sensor data 924. The sensor data 924 comprises information acquired from, or based on, the one or more sensors 820. For example, the sensor data 924 may comprise 3D information about an object in the facility 802. As described above, the sensors 820 may include a camera 820(1), which is configured to acquire one or more images. These images may be stored as the image data 926. The image data 926 may comprise information descriptive of a plurality of picture elements or pixels. Non-image data 928 may comprise information from other sensors 820, such as input from the microphones 820, weight sensors 820, and so forth.

User data 930 may also be stored in the data store 918. The user data 930 may include identity data, information indicative of a profile, purchase history, location data, images of the user 816, demographic data, and so forth. Individual users 816 or groups of users 816 may selectively provide user data 930 for use by the inventory management system 822. The individual users 816 or groups of users 816 may also authorize collection of the user data 930 during use of the facility 802 or access to user data 930 obtained from other systems. For example, the user 816 may opt-in to collection of the user data 930 to receive enhanced services while using the facility 802.

In some implementations, the user data 930 may include information designating a user 816 for special handling. For example, the user data 930 may indicate that a particular user 816 has been associated with an increased number of errors with respect to output data 826. The inventory management system 916 may be configured to use this information to apply additional scrutiny to the events 824 associated with this user 816. For example, events 824 that include an ITEM 804 having a cost or result above the threshold amount may be provided to the associates for processing regardless of the determined level of confidence in the output data 826 as generated by the automated system.

The inventory management system 916 may include one or more of a locating component 932, identification component 934, event determination component 936, and inquiry component 938.

The locating component 932 functions to locate items or users within the environment of the facility to allow the inventory management system 916 to assign certain events to the correct users. That is, the locating component 932 may assign unique identifiers to users as they enter the facility and, with the users' consent, may locating the position of the users throughout the facility 802 over the time they remain in the facility 802. The locating component 932 may perform this locating using sensor data 924, such as the image data 926. For example, the locating component 932 may receive the image data 926 and may use facial-recognition techniques to identify users from the images. After identifying a particular user within the facility, the locating component 932 may then locating the user within the images as the user moves throughout the facility 802. Further, should the locating component 932 temporarily "lose" a particular user, the locating component 932 may again attempt to identify the users within the facility based on facial recognition, and/or using other techniques such as voice recognition, or the like.

Therefore, upon receiving the indication of the time and location of the event in question, the locating component 932 may query the data store 918 to determine which one or more users were at or within a threshold distance of the location of the event at the particular time of the event. Further, the locating component 932 may assign different confidence levels to different users, with the confidence levels indicating how likely it is that each corresponding user is the user that is in fact associated with the event of interest.

The locating component 932 may access the sensor data 924 in order to determine this location data of the user and/or items. The location data provides information indicative of a location of an object, such as the item 804, the user 816, the tote 818, and so forth. The location may be absolute with respect to the facility 802 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 802, 5.2 m from an inventory location 814 along a heading of 169°, and so forth. For example, the location data may indicate that the user 816(1) is 25.2 m along the aisle 812(1) and standing in front of the inventory location 814. In comparison, a relative location may indicate that the user 816(1) is 32 cm from the tote 818 at a heading of 73° with respect to the tote 118. The location data may include orientation information, such as which direction the user 816 is facing. The orientation may be determined by the relative direction the user's 816 body is facing. In some implementations, the orientation may be relative to the interface device. Continuing the example, the location data may indicate that the user 816(1) is oriented with a heading of 0°, or looking north. In another example, the location data may indicate that the user 816 is facing towards the interface device.

The identification component 934 is configured to identify an object. In one implementation, the identification component 934 may be configured to identify an item 804. In another implementation, the identification component 934 may be configured to identify the user 816. For example, the identification component 934 may use facial recognition techniques to process the image data 926 and determine the identity data of the user 816 depicted in the images by comparing the characteristics in the image data 926 with previously stored results. The identification component 934 may also access data from other sensors 820, such as from an RFID reader 820, an RF receiver 820, fingerprint sensors, and so forth.

The event determination component 936 is configured to process the sensor data 924 and generate output data 826. The event determination component 936 may access information stored in the data store 918 including, but not limited to, event description data 942, confidence levels 944, or threshold values 996.

The event description data 942 comprises information indicative of one or more events 824. For example, the event description data 942 may comprise predefined profiles that designate movement of an item 804 from an inventory location 814 with the event 824 of "pick". The event description data 942 may be manually generated or automatically generated. The event description data 942 may include data indicative of triggers associated with events occurring in the facility 802. An event may be determined as occurring upon detection of the trigger. For example, sensor data 924 such as a change in weight from a weight sensor 820(6) at an inventory location 814 may trigger detection of an event of an item 804 being added or removed from the inventory location 814. In another example, the trigger may comprise an image of the user 816 reaching a hand toward the inventory location 814. In yet another example, the trigger may comprise two or more users 816 approaching to within a threshold distance of one another.

The event determination component 936 may process the sensor data 924 using one or more techniques including, but not limited to, artificial neural networks, classifiers, decision trees, support vector machines, Bayesian networks, and so forth. For example, the event determination component 936 may use a decision tree to determine occurrence of the "pick" event 824 based on sensor data 924. The event determination component 936 may further use the sensor data 924 to determine one or more tentative results 948. The one or more tentative results 948 comprise data associated with the event 824. For example, where the event 824 comprises a disambiguation of users 816, the tentative results 948 may comprise a list of possible user 816 identities. In another example, where the event 824 comprises a disambiguation between items 104, the tentative results 948 may comprise a list of possible item identifiers. In some implementations, the tentative result 948 may indicate the possible action. For example, the action may comprise the user 816 picking, placing, moving an item 804, damaging an item 804, providing gestural input, and so forth.

In some implementations, the tentative results 948 may be generated by other components. For example, the tentative results 948 such as one or more possible identities or locations of the user 816 involved in the event 824 may be generated by the locating component 932. In another example, the tentative results 948 such as possible items 804 that may have been involved in the event 824 may be generated by the identification component 934.

The event determination component 936 may be configured to provide a confidence level 944 associated with the determination of the tentative results 948. The confidence level 944 provides indicia as to the expected level of accuracy of the tentative result 948. For example, a low confidence level 944 may indicate that the tentative result 948 has a low probability of corresponding to the actual circumstances of the event 824. In comparison, a high confidence level 944 may indicate that the tentative result 948 has a high probability of corresponding to the actual circumstances of the event 824.

In some implementations, the tentative results 948 having confidence levels 944 that exceed the threshold result 996 may be deemed to be sufficiently accurate and thus may be used as the output data 826. For example, the event determination component 936 may provide tentative results 948 indicative of the three possible items 804(1), 804(2), and 804(3) corresponding to the "pick" event 824. The confidence levels 944 associated with the possible items 804(1), 804(2), and 804(3) may be 25%, 70%, 92%, respectively. Continuing the example, the threshold result 396 may be set such that confidence level 944 of 90% are deemed to be sufficiently accurate. As a result, the event determination component 936 may designate the "pick" event 824 as involving item 804(3).

The inquiry component 938 may be configured to use at least a portion of the sensor data 924 associated with the event 824 to generate inquiry data 950. In some implementations, the inquiry data 950 may include one or more of the tentative results 948 or supplemental data 952. The inquiry component 938 may be configured to provide inquiry data 950 to one or more devices associated with one or more human associates.

An associate user interface is presented on the respective devices of associates. The associate may generate response data 954 by selecting a particular tentative result 948, entering new information, indicating that they are unable to answer the inquiry, and so forth.

The supplemental data 952 comprises information associated with the event 824 or that may be useful in interpreting the sensor data 924. For example, the supplemental data 952 may comprise previously stored images of the items 804. In another example, the supplemental data 952 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 926 during presentation to an associate.

The inquiry component 938 processes the response data 954 provided by the one or more associates. The processing may include calculating one or more statistical results associated with the response data 954. For example, statistical results may include a count of the number of times associates selected a particular tentative result 948, determination of a percentage of the associates that selected a particular tentative result 948, and so forth.

The inquiry component 938 is configured to generate the output data 826 based at least in part on the response data 954. For example, given that a majority of the associates returned response data 954 indicating that the item 804 associated with the "pick" event 824 is item 804(5), the output data 826 may indicate that the item 804(5) was picked.

The inquiry component 938 may be configured to selectively distribute inquiries to particular associates. For example, some associates may be better suited to answering particular types of inquiries. Performance data, such as statistical data about the performance of the associates, may be determined by the inquiry component 938 from the response data 954 provided by the associates. For example, information indicative of a percentage of different inquiries in which the particular associate selected response data 954 that disagreed with the majority of associates may be maintained. In some implementations, test or practice inquiry data 950 having a previously known correct answer may be provided to the associate for training or quality assurance purposes. The determination of the set of associates to use may be based at least in part on the performance data.

By using the inquiry component 938, the event determination component 936 may be able to provide high reliability output data 826 that accurately represents the event 824. The output data 826 generated by the inquiry component 938 from the response data 954 may also be used to further train the automated systems used by the inventory management system 916. For example, the sensor data 924 and the output data 826, based on response data 954, may be provided to one or more of the components of the inventory management system 916 for training in process improvement. Continuing the example, this information may be provided to an artificial neural network, Bayesian network, and so forth, to further train these systems such that the confidence level 944 and the tentative results 948 produced in the future for the same or similar input is improved.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   storing, in a memory of a camera, a temperature calibration factor indicating a relationship between a plurality of temperatures associated with the camera and respective ones of a plurality of voltages or amounts of currents to provide to an actuator of the camera to adjust a position of at least one of a lens assembly of the camera or an image sensor of the camera, wherein the calibration factor is associated with the camera having a desired object distance;
   determining a first temperature associated with the camera;
   calculating, based at least in part on the temperature calibration factor and the first temperature, at least one of a first voltage or a first amount of current to provide to the actuator;
   providing the at least one of the first voltage or the first amount of current to the actuator such that the lens assembly is a first distance from the image sensor, wherein the first distance results in the camera having a desired object distance at the first temperature;
   determining a second temperature associated with the camera;
   calculating, based at least in part on the temperature calibration factor and the second temperature, at least one of a second voltage or a second amount of current to provide to the actuator; and
   providing the at least one of the second voltage or the second amount of current to the actuator such that the lens assembly is a second distance from the image sensor, wherein the second distance results in the camera having the desired object distance at the second temperature.

2. The method of claim 1, further comprising:
   prior to determining the first temperature:
   determining a third temperature that the camera was subjected to during calibration of the camera;
   determining at least one of a third voltage or a third amount of current that was provided to the actuator to adjust the lens assembly during the calibration, and
   wherein the temperature calibration factor is based at least in part on the third temperature and the at least one of the third voltage or the third amount of current.

3. The method of claim 2, further comprising:
   determining a temperature difference between the first temperature and the third temperature; and
   calculating, based at least in part on the temperature difference, the temperature calibration factor.

4. The method of claim 3, wherein the temperature calibration factor indicates a rate at which an estimated amount of current or an estimated amount of voltage to provide to the actuator changes with respect to temperatures associated with the camera to maintain an object distance of the camera.

5. The method of claim 1, further comprising:
   prior to determining the first temperature, determining a third temperature associated with the camera;
   determining that a change in temperature between the first temperature and the third temperature is greater than or equal to a threshold change in temperature; and
   wherein calculating the at least one of the first voltage or the first amount of current is performed at least partly responsive to determining that the change in temperature is greater than or equal to the threshold change in temperature.

6. The method of claim 1, further comprising:
   prior to determining the first temperature, determining a third temperature associated with the camera;
   determining that more than a threshold amount of time has passed since determining the third temperature, and
   wherein determining the first temperature is performed at least partly in response to determining that more than the threshold amount of time has passed since determining the third temperature.

7. The method of claim 1, further comprising:
   determining an orientation of the camera at which the camera was positioned during a calibration of the camera;
   determining at least one of a third voltage or a third amount of current that was provided to the actuator at the third orientation of the camera during the calibration; and
   wherein determining the at least one of the first voltage or the first amount of current to provide to the actuator is further based at least in part on the orientation of the camera and the at least one of the third voltage or the third amount of current.

8. The method of claim 1, wherein
   calculating the at least one of the first voltage or the first amount of current to provide to the actuator is further based at least in part on determining a current orientation of the camera.

9. A system comprising:
   a camera comprising:
      an image sensor;
      a lens assembly; and
      an actuator for adjusting a position of at least one of the lens assembly or the image sensor;
   one or more processors; and
   one or more computer-readable media storing computer-executable instructions that, when executed, cause the system to perform acts comprising:
      storing a calibration factor indicating a relationship between a plurality of temperatures associated with the camera and respective ones of a plurality of at least one of voltages or amounts of currents to provide to the actuator, wherein the calibration factor is associated with the camera having a desired object distance;
      determining a first temperature associated with the camera;
      calculating, based at least in part on the calibration factor and the first temperature, at least one of a first voltage or a first amount of current to provide to the actuator, wherein the at least one of the first voltage or the first amount of current, when applied to the actuator, causes the actuator to adjust a position of the at least one of the lens assembly or the image sensor;

providing the at least one of the first voltage or the first amount of current to the actuator such that the lens assembly is a first distance from the image sensor, wherein the first distance results in the camera having the desired object distance at the first temperature;

determining a second temperature associated with the camera;

calculating, based at least in part on the calibration factor and the second temperature, at least one of a second voltage or a second amount of current to provide to the actuator; and providing the at least one of the second voltage or the second amount of current to the actuator such that the lens assembly is a second distance from the image sensor, wherein the second distance results in the camera having the desired object distance at the second temperature.

10. The system of claim 9, wherein the instructions cause the system to perform further acts comprising:

determining an orientation of the camera at which the camera was positioned during calibration of the camera;

determining at least one of a third voltage or a third amount of current that was provided to the actuator to position the lens assembly during the calibration, and wherein determining the at least one of the first voltage or the first amount of current to provide to the actuator is based at least in part on the orientation and the at least one of the third voltage or the third amount of current.

11. The system of claim 10, wherein:

the orientation includes a first angle of orientation relative to an axis;

the orientation includes a second angle of orientation relative to the axis, wherein the first angle of orientation is different than the second angle of orientation; and the at least one of the first voltage or the first amount of current is based at least in part on the first angle of orientation relative to the axis and the second angle of orientation relative to the axis.

12. The system of claim 11, wherein the axis is parallel to a gravitational force.

13. The system of claim 9, wherein the instructions cause the system to perform further acts comprising:

prior to determining the second temperature associated with the camera:

determining that a threshold amount of time has passed since determining the first temperature associated with the camera, and wherein determining the second temperature associated with the camera is performed at least partly responsive to determining that the threshold amount of time has passed since determining the first temperature.

14. The system of claim 9, wherein the instructions cause the system to perform further acts comprising:

determining that a change in temperature between the first temperature and the second temperature is greater than or equal to a threshold change in temperature, and wherein determining the at least one of the second voltage or the second amount of current is performed at least partly responsive to determining that the change in temperature between the first temperature and the second temperature is greater than or equal to the threshold change in temperature.

15. The system of claim 9, wherein the instructions cause the system to perform further acts comprising:

identifying an association between an orientation of the camera and the at least one of the first voltage or the first amount of current, and wherein determining the at least one of the first voltage or the first amount of current to provide the actuator is based at least in part on the association between the first orientation and the at least one of the first voltage or the first amount of current.

16. A system comprising:

a camera comprising:

an image sensor;

a lens assembly; and an actuator for adjusting a position of at least one of the lens assembly or the image sensor;

one or more processors; and one or more computer-readable media storing computer-executable instructions that, when executed, cause the system to perform acts comprising:

storing a calibration factor indicating a relationship between a plurality of temperatures associated with the camera and respective ones of a plurality of voltages or amounts of currents to provide to the actuator, wherein the calibration factor is associated with the camera having a desired object distance at the plurality of temperatures;

determining a first temperature associated with the camera;

calculating, based at least in part on the calibration factor and the first temperature, at least one of a first voltage or a first amount of current to provide to the actuator, wherein the at least one of the first voltage or the first amount of current, when applied to the actuator, causes the actuator to adjust a position of the at least one of the lens assembly or the image sensor;

providing the at least one of the first voltage or the first amount of current to the actuator such that the lens assembly is a first distance from the image sensor, wherein the first distance results in the camera having the desired object distance at the first temperature.

17. The system of claim 16, wherein the instructions cause the system to perform further acts comprising:

determining an orientation of the camera at which the camera was positioned during calibration of the camera;

determining at least one of a third voltage or a third amount of current that was provided to the actuator to position the lens assembly during the calibration, and wherein determining the at least one of the first voltage or the first amount of current to provide to the actuator is based at least in part on the orientation and the at least one of the third voltage or the third amount of current.

18. The system of claim 16, wherein the instructions cause the system to perform further acts comprising:

prior to determining the first temperature:

determining a second temperature associated with the camera;

determining that a threshold amount of time has passed since determining the second temperature associated with the camera, and wherein determining the first temperatures associated with the camera is performed at least partly responsive to determining that the threshold amount of time has passed since determining the second temperature.

19. The system of claim 16, wherein the instructions cause the system to perform further acts comprising:

during a calibration of the camera:
  determining a first association between a second temperature associated with the camera and at least one of a second voltage or a second amount of current to provide to the actuator such that the lens assembly is a second distance from the image sensor, wherein the second distance results in the camera having the desired object distance at the second temperature;
  determining a second association between a third temperature associated with the camera and at least one of a third voltage or a third amount of current to provide to the actuator such that the lens assembly is a third distance from the image sensor, wherein the third distance results in the camera having the desired object distance at the third temperature; and
  calculating, based at least in part on a mathematical relationship between the first association and the second association, the calibration factor.

* * * * *